United States Patent
Kuroda et al.

(10) Patent No.: US 12,484,574 B2
(45) Date of Patent: Dec. 2, 2025

(54) AGENT FOR PROMOTING UNDIFFERENTIATION AND CRYOPROTECTIVE AGENT USING APROTIC ZWITTERION

(71) Applicant: JAPAN SCIENCE AND TECHNOLOGY AGENCY, Kawaguchi (JP)

(72) Inventors: Kosuke Kuroda, Kanazawa (JP); Eishu Hirata, Kanazawa (JP)

(73) Assignee: NATIONAL UNIVERSITY CORPORATION KANAZAWA UNIVERSITY, Kanazawa (JP)

( * ) Notice: Subject to any disclaimer, the term of this patent is extended or adjusted under 35 U.S.C. 154(b) by 1023 days.

(21) Appl. No.: 17/609,927

(22) PCT Filed: May 8, 2020

(86) PCT No.: PCT/JP2020/018668
§ 371 (c)(1),
(2) Date: May 27, 2022

(87) PCT Pub. No.: WO2020/230721
PCT Pub. Date: Nov. 19, 2020

(65) Prior Publication Data
US 2022/0287294 A1    Sep. 15, 2022

(30) Foreign Application Priority Data
May 13, 2019  (JP) .................. 2019-090509

(51) Int. Cl.
*A01N 1/125*     (2025.01)
*C09K 3/18*      (2006.01)
*C12N 5/00*      (2006.01)

(52) U.S. Cl.
CPC ............ *A01N 1/125* (2025.01); *C09K 3/18* (2013.01); *C12N 5/525* (2025.01)

(58) Field of Classification Search
CPC ....... C12N 5/525; A01N 1/125; A01N 1/0221
See application file for complete search history.

(56) References Cited

U.S. PATENT DOCUMENTS

| | | |
|---|---|---|
| 2014/0255861 A1 | 9/2014 | Smith et al. |
| 2019/0037832 A1 | 2/2019 | Zhang et al. |
| 2019/0390173 A1 | 12/2019 | Nojima et al. |

FOREIGN PATENT DOCUMENTS

| | | |
|---|---|---|
| JP | 2018191623 A | 12/2018 |
| WO | 2018143258 A1 | 8/2018 |

OTHER PUBLICATIONS

Espacenet Machine translation of JP 2018-191623 (Dec. 6, 2018).*
PE2E Search Machine translation of JP 2018-191623 (Dec. 6, 2018).*
Honma et al., "Induction of Differentiation of Human Myeloid Leukemia HL-60 Cells by Novel Nonphosphorus Alkyl Ether Lipids", Lipids, 1991, vol. 26, No. 12, pp. 1445-1449.
Office Action for Corresponding Japanese Application No. 2021-519409, Nov. 15, 2022, 7 pages.
Jiang et al., "Down-regulation of TRRAP-dependent hTERT and TRRAP-independent CAD activation by Myc/Max contributes to the differentiation of HL60 cells after exposure to DMSO", International Immunopharmacology, 2006, vol. 6, No. 7, pp. 1204-1213.
Young et al., "Expression of metalloproteinases and inhibitors in the differentiation of P19CL6 cells into cardiac myocytes" Biochemical and Biophysical Research Communications, 2004, vol. 322, No. 3, pp. 759-765.
Katkov et al., "Cryopreservation by slow cooling with DMSO diminished production of Oct-4 pluripotency marker in human embryonic stem cells", Cryobiology, 2006, vol. 53, No. 2, pp. 194-205.
Fujisawa et al., "Evaluating effects of L-carnitine on human bone-marrow-derived mesenchymal stem cells", Cell Tissue Res., 2017, vol. 368, pp. 301-310.
International Search Report for Corresponding International Application No. PCT/JP2020/018668 (2 Pages) (Jul. 21, 2020).

* cited by examiner

*Primary Examiner* — John Pak
(74) *Attorney, Agent, or Firm* — Lucas & Mercanti, LLP

(57) ABSTRACT

An object of the present invention is to provide an agent for promoting undifferentiation that dissolves a drug, as DMSO or the like does, but is capable of promoting undifferentiation without inducing cell differentiation when added to a medium. The agent for promoting undifferentiation of the present invention has an aprotic zwitterion represented by the following formula (1)

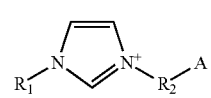

(1)

wherein A is an anion selected from the group consisting of $SO_3^-$, $-COO^-$, $-OP=O(H)O^-$, $-OP=O(CH_3)O^-$ and $-OP=O(OR_3)O^-$, $R_1$ is an alkyl group having 1 to 8 carbon atoms and optionally containing one or two oxygen atoms in the molecular chain, $R_2$ is an alkylene group having 3 to 5 carbon atoms, and $R_3$ is hydrogen or an alkyl group optionally having a heteroatom in the molecular chain.

5 Claims, 12 Drawing Sheets

AGENT FOR PROMOTING UNDIFFERENTIATION AND CRYOPROTECTIVE AGENT USING APROTIC ZWITTERION

CROSS-REFERENCE TO RELATED APPLICATIONS

This application is a 371 of PCT/JP2020/018668, filed May 8, 2020, which claims the benefit of Japanese Patent Application No. 2019-090509, filed May 13, 2019.

TECHNICAL FIELD

The present invention relates to an agent for promoting undifferentiation and a cryoprotective agent.

BACKGROUND ART

Heretofore, in the case of adding a hydrophobic drug to a medium in assay using cells, the hydrophobic drug has been dissolved in a solvent such as dimethyl sulfoxide (DMSO) and then dispersed in the medium. However, it is known that DMSO might induce the differentiation of stem cells (Non Patent Literatures 1 to 3). By contrast, for example, "Cellartis® DEF-CS 500 Culture System" manufactured by Takara Bio Inc. is provided as a medium that maintains an undifferentiation state, but is susceptible to further improvement.

Also, DMSO or glycerol is widely used as a cryoprotective agent in cryopreserving cells and has been found as the most effective reagent for protecting cells or organelles. Such a cryoprotective agent suppresses the growth of ice crystals formed inside cells at the time of cell freezing. DMSO, etc. has cell membrane permeability and inhibits ice crystal formation by slowing down the growth rate of ice crystals inside and outside cells. However, DMSO and glycerol are physiologically toxic and are known to cause hypertension, nausea and vomiting when transfused together with cells to recipients or handled by persons in charge.

In order to enhance the survival rate of cells, the cryoprotective agent such as DMSO is often used as a mixture with a protein such as bovine serum albumin. However, since serum has the risk of being contaminated with viruses or the like and differs in bioactivity among lots, a huge amount of labor is required for selecting lots of high quality (Patent Literature 1). Furthermore, use of proteins from another animal species may cause rejection of concern in regenerative medicine.

Meanwhile, the cryopreservation of sperm is considered a critical issue in the livestock business. In order to maintain the motility of sperm, use of betaine or carnitine instead of a cryopreserving agent such as glycerin has been proposed. In these cases, however, proteins from another animal species such as egg yolk are used in media (Patent Literatures 2 and 3).

CITATION LIST

Patent Literature

Patent Literature 1: JP Patent Publication (Kokai) No. 2012-105585 A (2012) (paragraph 0002)
Patent Literature 2: JP Patent Publication (Kokai) No. 2-422 A (1990)
Patent Literature 3: JP Patent Publication (Kokai) No. 2013-78272 A (2013)

Non Patent Literature

Non Patent Literature 1: Jiang, G., et al., Int. Immunopharmacol., 6 (7), 1204-1213 (2006)
Non Patent Literature 2: Young, D. A., et al., Biochem. Biophys. Res. Commun., 322 (3), 759-765 (2004)
Non Patent Literature 3: Katkov, I. I., et al., Cryobiology, 53 (2), 194-205 (2006)

SUMMARY OF INVENTION

Technical Problem

Accordingly, in light of the previous circumstances, an object of the present invention is to provide an agent for promoting undifferentiation that dissolves a drug, as DMSO or the like does, but is capable of promoting undifferentiation without inducing cell differentiation when added to a medium. The "agent for promoting undifferentiation" according to the present invention means an agent that amplifies an undifferentiation marker and actively promotes undifferentiation as well as an agent that maintains an undifferentiation state without inducing differentiation.

Another object of the present invention is to provide a novel cryoprotective agent that has low toxicity and offers a high survival rate of cells after freezing and thawing, instead of a conventional cryoprotective agent containing DMSO or the like. A further object of the present invention is to provide a cryoprotective agent that eliminates the need of being used in combination with, for example, a protein purified from serum and hence has a low risk of being contaminated with viruses or the like, has constant quality, and is capable of circumventing rejection in regenerative medicine.

Moreover, in light of the previous circumstances, an object of the present invention is to provide an additive that dissolves a drug, as DMSO or the like does, but has low toxicity and has less influence on cell cycles or cell functions when added to a medium.

Solution to Problem

The present inventors have found that an aprotic zwitterion having both positive and negative charges in one molecule is capable of favorably dissolving various hydrophobic drugs and at the same time, promotes the undifferentiation of cells or maintains an undifferentiation state, leading the completion of the invention.

The present inventors have also found that the aprotic zwitterion described above has low toxicity to cells and functions in itself as a cryoprotective agent, leading the completion of the invention. Specifically, the present invention will be summarized below.

(1) An agent for promoting undifferentiation comprising an aprotic zwitterion.
(2) The agent for promoting undifferentiation according to (1), wherein a cation site of the aprotic zwitterion is a cation selected from the group consisting of an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation.

(3) The agent for promoting undifferentiation according to (1), wherein a cation site of the aprotic zwitterion is an imidazolium cation, a phosphonium cation or an ammonium cation.

(4) The agent for promoting undifferentiation according to any one of (1) to (3), wherein a cation site of the aprotic zwitterion has one or more alkyl groups each having 1 to 8 carbon atoms and optionally having one or more heteroatoms in the molecular chain as a substituent.

(5) The agent for promoting undifferentiation according to any one of (1) to (4), wherein a cation site and an anion site of the aprotic zwitterion are connected via one or more alkylene groups each having 1 to 5 carbon atoms and optionally having one or more heteroatoms in the molecular chain.

(6) The agent for promoting undifferentiation according to (1), wherein the aprotic zwitterion is represented by the following formula (1):

[Formula 1]

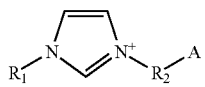

(1)

wherein A is an anion selected from the group consisting of $SO_3^-$, $—COO^-$, $—OP=O(H)O^-$, $—OP=O(CH_3)O^-$ and $—OP=O(OR_3)O^-$, $R_1$ is an alkyl group having 1 to 8 carbon atoms and optionally containing one or two oxygen atoms in the molecular chain, $R_2$ is an alkylene group having 3 to 5 carbon atoms, and $R_3$ is hydrogen or an alkyl group optionally having a heteroatom in the molecular chain.

(7) The agent for promoting undifferentiation according to (6), wherein the aprotic zwitterion is represented by the following formula (2) or (3):

[Formula 2]

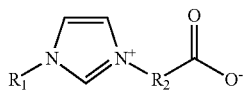

(2)

[Formula 3]

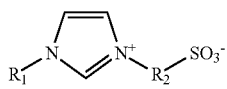

(3)

wherein $R_1$ and $R_2$ are as defined in (6).

(8) A cryoprotective agent comprising an aprotic zwitterion.

(9) The cryoprotective agent according to (8), wherein a cation site of the aprotic zwitterion is a cation selected from the group consisting of an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation.

(10) The cryoprotective agent according to (8), wherein a cation site of the aprotic zwitterion is an imidazolium cation, a phosphonium cation or an ammonium cation.

(11) The cryoprotective agent according to any one of (8) to (10), wherein a cation site of the aprotic zwitterion has one or more alkyl groups each having 1 to 8 carbon atoms and optionally having one or more heteroatoms in the molecular chain as a substituent.

(12) The cryoprotective agent according to any one of (8) to (11), wherein a cation site and an anion site of the aprotic zwitterion are connected via one or more alkylene groups each having 1 to 5 carbon atoms and optionally having one or more heteroatoms in the molecular chain.

(13) The cryoprotective agent according to (8), wherein the aprotic zwitterion is represented by the following formula (1):

[Formula 4]

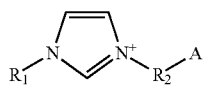

(1)

wherein A is an anion selected from the group consisting of $SO_3^-$, $—COO^-$, $—OP=O(H)O^-$, $—OP=O(CH_3)O^-$ and $—OP=O(OR_3)O^-$, $R_1$ is an alkyl group having 1 to 8 carbon atoms and optionally containing one or two oxygen atoms in the molecular chain, $R_2$ is an alkylene group having 3 to 5 carbon atoms, and $R_3$ is hydrogen or an alkyl group optionally having a heteroatom in the molecular chain.

(14) The cryoprotective agent according to (13), wherein the aprotic zwitterion is represented by the following formula (2) or (3):

[Formula 5]

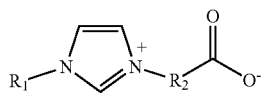

(2)

[Formula 6]

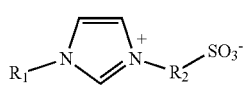

(3)

wherein $R_1$ and $R_2$ are as defined in (13).

(15) A medium for cryopreservation comprising an aprotic zwitterion represented by the general formula (4):

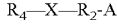

$R_4—X—R_2$-A  (4)

wherein $R_4$ is an alkyl group having 1 to 7 carbon atoms, an alkenyl group having 1 to 7 carbon atoms, or an alkyl group having 1 to 7 carbon atoms and containing an ether bond, X is a cation moiety of the zwitterion and represents a cation selected from the group consisting of an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation, A represents an anion moiety and represents an anion selected from the group consisting of $SO_3^-$, $—COO^-$, $—OP=O(H)O^-$, $—OP=O(CH_3)O^-$ and $—OP=O(OR_3)O^-$, $R_2$ is an alkylene group having 1 to 5 carbon atoms and optionally having a substituent, and $R_3$ is hydrogen or an alkyl group optionally having a heteroatom in the molecular chain.

(16) The medium for cryopreservation according to (15), wherein in the general formula (4), X has a cyclic structure having 1 to 6 carbon atoms and containing one or two or more nitrogen atoms and has one or two or more substituents on the nitrogen atom(s), A is a carboxyl group or a sulfonate group, the cation is present on nitrogen or non-localized in the whole X, and the anion is present on the carboxyl group or the sulfonate group.

(17) The medium for cryopreservation according to (15) or (16), wherein the aprotic zwitterion is represented by the following formula (1):

[Formula 7]

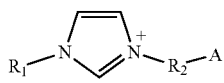
(1)

wherein A is an anion selected from the group consisting of $SO_3^-$, $-COO^-$, $-OP=O(H)O^-$, $-OP=O(CH_3)O^-$ and $-OP=O(OR_3)O^-$, $R_1$ is an alkyl group having 1 to 7 carbon atoms, an alkenyl group having 1 to 7 carbon atoms, or an alkyl group having 1 to 7 carbon atoms and containing an ether bond, $R_2$ is an alkylene group having 3 to 5 carbon atoms, and $R_3$ is hydrogen or an alkyl group optionally having a heteroatom in the molecular chain.

(18) The medium for cryopreservation according to any one of (15) to (17), wherein the aprotic zwitterion is represented by the following formula (2) or (3):

[Formula 8]

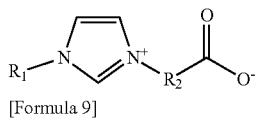
(2)

[Formula 9]

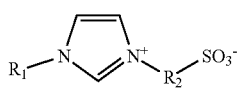
(3)

wherein $R_1$ and $R_2$ are as defined in (17).

(19) The medium for cryopreservation according to any one of (15) to (18), wherein the $R_1$ or the $R_4$ is an alkenyl group having 1 to 7 carbon atoms.

(20) A medium for cryopreservation consisting of only an aprotic zwitterion according to any one of (15) to (19) and water.

(21) A medium for cryopreservation according to (20) which is supplemented with an additive consisting of one or more cell-permeable substances.

(22) The medium for cryopreservation according to (20), wherein the cell-permeable substance is at least one member selected from the group consisting of glycerin, dimethyl sulfoxide (DMSO), ethylene glycol, and propylene glycol.

(23) An agent for promoting undifferentiation for a cell, a tissue or an individual, comprising an aprotic zwitterion according to any one of (15) to (19).

(24) An agent for cryopreserving a cell, a tissue or an individual, comprising an aprotic zwitterion according to any one of (15) to (19).

(25) An agent for inhibiting ice crystal formation comprising an aprotic zwitterion according to any one of (15) to (19).

(26) An agent maintaining undifferentiation comprising an aprotic zwitterion according to any one of (15) to (19).

(27) A vitrifying agent comprising an aprotic zwitterion according to any one of (15) to (19).

(28) A freeze drying agent comprising an aprotic zwitterion according to any one of (15) to (19).

(29) A dehydrating agent for a cell, a tissue or an individual, comprising an aprotic zwitterion according to any one of (15) to (19).

(30) An agent for low-temperature (which is equal to or lower than ordinary temperature) preservation of a cell, a tissue or an individual, comprising an aprotic zwitterion according to any one of (15) to (19).

(31) A solution for low-temperature (which is equal to or lower than ordinary temperature) transport of a cell, a tissue or an individual, comprising an aprotic zwitterion according to any one of (15) to (19).

Advantageous Effects of Invention

The agent for promoting undifferentiation comprising an aprotic zwitterion according to the present invention can dissolve a hydrophobic drug, as DMSO or the like does, and at the same time, can amplify an undifferentiation marker and promote undifferentiation without inducing cell differentiation.

The cryoprotective agent comprising an aprotic zwitterion according to the present invention can keep the survival rate of cells high after freezing and thawing. Also, this cryoprotective agent can be used alone without the need of being mixed with, for example, serum or a protein or a peptide purified from serum, and therefore has no risk of being contaminated with viruses or the like and can circumvent rejection in regenerative medicine.

DESCRIPTION OF EMBODIMENTS

Figure 1:
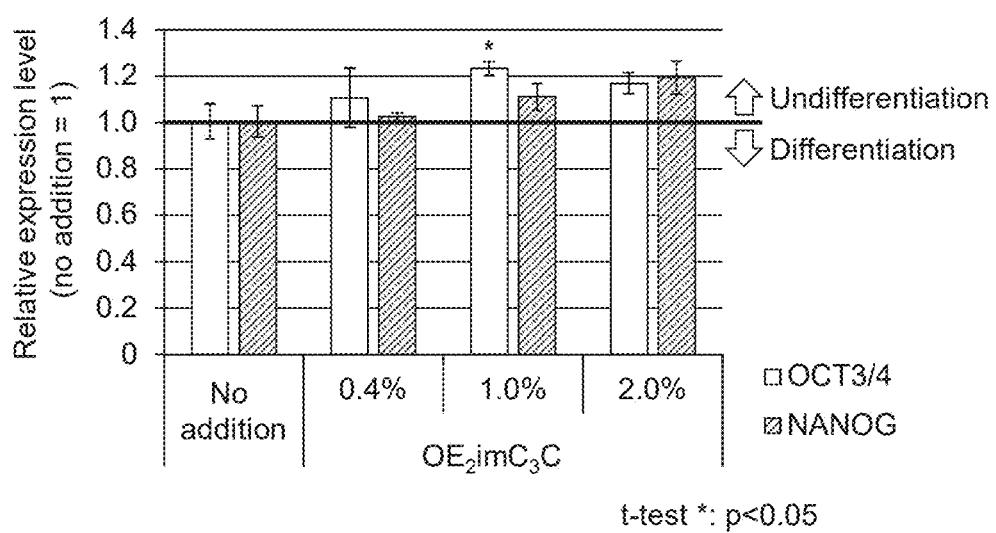
FIG. 1 is a graph showing results of undifferentiation-specific gene expression analysis (with feeder cells).

Hereinafter, the present invention will be described in detail with reference to embodiments.

(Agent for Promoting Undifferentiation)

First, the agent for promoting undifferentiation according to the present invention will be described. The agent for promoting undifferentiation according to one embodiment of the present invention comprises an aprotic zwitterion. A protic zwitterion refers to a zwitterion that is capable of losing a charge within the molecule via proton movement in principle, and almost all of natural zwitterions such as amino acids correspond thereto. By contrast, a zwitterion that has no proton movable between an anion and a cation within the molecule under usual mild conditions is defined as an aprotic zwitterion and rarely occurs naturally. Examples of such an aprotic zwitterion can include a substance in which an ionic liquid-like cation site and an ionic liquid-like anion site are linked via a covalent bond. Preferably, the cation site and the anion site of the aprotic zwitterion are connected via one or more alkylene groups each having 1 to 5 carbon atoms and optionally having one or more heteroatoms in the molecular chain. In this context, examples of the heteroatom include oxygen, nitrogen, sulfur, and phosphorus. The alkylene group thus having 1 to 5 carbon atoms can weaken the toxicity of the aprotic zwitterion to cells.

It is generally known that organic ions, particularly, organic ions accepted as ionic liquids (organic salts containing a cation such as an imidazolium cation, a phosphonium cation, an ammonium cation, a sulfonium cation, a pyrazolium cation, a pyridinium cation, a pyrrolidinium cation, a morpholinium cation, a cyclopropenylium cation, or a piperidinium cation), exhibit toxicity through the insertion of the alkyl chain (which may contain a heteroelement) of the cation to cell membranes (Lim, G. S., Zidar, J., Cheong, D. W., Jaenicke, S. & Klahn, M. Impact of ionic liquids in aqueous solution on bacterial plasma membranes studied with molecular dynamics simulations. J. Phys. Chem. B 118, 10444-10459 (2014)). This process is composed of the following two stages.

(1) The cation of an organic salt comes close to the phosphoric acid of a lipid bilayer (cell membrane) through electrostatic interaction.

(2) The alkyl chain of the cation of the organic salt interacts hydrophobically with the lipid site of the lipid bilayer so that the alkyl chain of the cation is inserted to the lipid bilayer to disrupt the cell membrane.

The present inventors have found it possible to suppress toxicity by introducing a highly polar anion to the end of the alkyl chain of the cation to prepare an aprotic zwitterion. Specifically, the introduction of such an anion causes electrostatic repulsion between the phosphoric acid and the anion and can thereby inhibit the stage (1). Also, the introduction of the anion increases polarity and can thereby suppress the hydrophobic interaction in the stage (2). Hence, the toxicity of the organic salt containing a cation such as imidazolium, phosphonium, ammonium, sulfonium, pyridinium, or pyrrolidinium can be drastically reduced.

In the present embodiment, examples of the ionic liquid cation of the aprotic zwitterion include an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation having one or more substituents. Among them, an imidazolium cation, a phosphonium cation or an ammonium cation having substituent(s) is preferably used. The respective substituents may be the same as or different from each other and can be appropriately selected from, for example, an alkyl group having 1 to 18 carbon atoms and optionally having one or more heteroatoms in the molecular chain, and an alkoxy group having 1 to 18 carbon atoms. Particularly, the substituents are preferably one or more alkyl groups each having 1 to 8 carbon atoms and optionally having one or more heteroatoms in the molecular chain. The alkyl chain thus having 1 to 8 carbon atoms can further weaken toxicity to cells. In this context, examples of the heteroatom include oxygen, nitrogen, sulfur, and phosphorus.

Examples of the ionic liquid-like anion of the aprotic zwitterion can include, but are not limited to, a sulfonate ion $—SO_3^-$, a carboxylate ion $—COO^-$, a phosphate ion $—OP=O(H)O^-$, $—OP=O(CH_3)O^-$, and $—OP=O(OR_3)O^-$ (wherein $R_3$ is hydrogen or an alkyl group optionally having a heteroatom in the molecular chain).

Particularly, an aprotic zwitterion represented by the following formula (1):

[Formula 10]

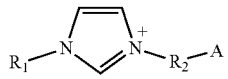

(1)

is preferably used as the aprotic zwitterion contained in the agent for promoting undifferentiation. In the formula (1), A is an anion selected from the group consisting of $SO_3^-$, $—COO^-$, $—OP=O(H)O^-$, $—OP=O(CH_3)O^-$ and $—OP=O(OR_3)O^-$ (wherein $R_3$ is hydrogen or an alkyl group optionally having a heteroatom in the molecular chain). Examples of the heteroatom include oxygen, nitrogen, sulfur, and phosphorus. Examples of the alkyl group represented by $R_3$ include, but are not limited to, a methyl group, an ethyl group, a propyl group, a butyl group, and a propyl group. Specifically, the aprotic zwitterion contained in the agent for promoting undifferentiation according to the present embodiment includes zwitterions represented by the following formulas (2) and (3):

[Formula 11]

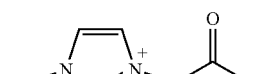

(2)

[Formula 12]

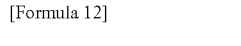

(3)

In the formulas (1) to (3), $R_1$ is an alkyl group having 1 to 8 carbon atoms and optionally containing one or two oxygen atoms in the molecular chain, and $R_2$ is an alkylene group having 3 to 5 carbon atoms. Specific examples of $R_1$ include a methyl group, an ethyl group, a propyl group, a butyl group, a pentyl group, CH₃OCH₂CH₂—, and CH₃OCH₂CH₂OCH₂CH₂—. Specific examples of $R_2$ include, but are not limited to, a propylene group, a butylene group, and a pentylene group.

Particularly, the following aprotic zwitterions have low toxicity to cells and as such, are each suitably used in the agent for promoting undifferentiation.

[Formula 13]

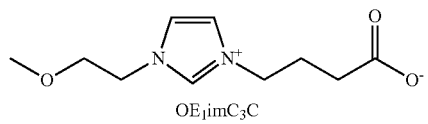

$OE_1imC_3C$

[Formula 14]

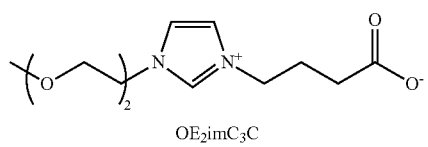

$OE_2imC_3C$

[Formula 15]

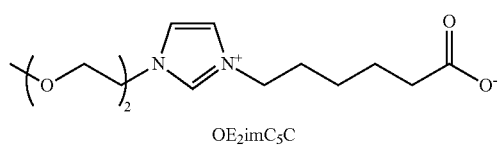

$OE_2imC_5C$

[Formula 16]

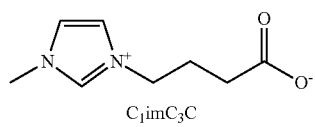

$C_1imC_3C$

[Formula 17]

$C_4imC_3C$

[Formula 18]

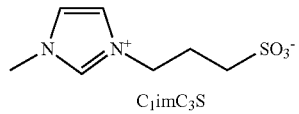

$C_1imC_3S$

[Formula 19]

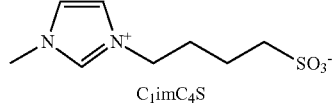

$C_1imC_4S$

[Formula 20]

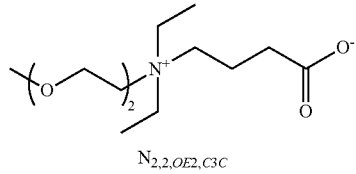

$N_{2,2,OE2,C3C}$

-continued

[Formula 21]

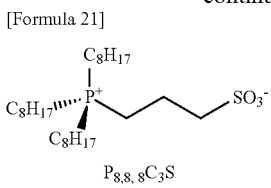

$P_{8,8,8}C_3S$

The aprotic zwitterion as described above can be synthesized by appropriately adopting an organic synthesis method general for those skilled in the art. Specifically, as for an aprotic zwitterion in which the cation represented by the formula (1) is an imidazolium ion, for example, 1-alkylimidazole and ethyl bromoalkylate are refluxed in acetonitrile, and the resultant is mixed with an anion exchange resin. Then, the solvent can be distilled off under reduced pressure to obtain an aprotic zwitterion consisting of imidazolium and carboxylate. The alkyl group on imidazole may contain one or more heteroatoms, for example, one or two oxygen atoms. Also, an aprotic zwitterion having a cation other than the imidazolium cation can be synthesized by changing the 1-alkylimidazole to trialkylphosphine, trialkylamine, dialkylsulfone, pyridine, N-alkylpyrrolidine, or the like. Alternatively, NaH is mixed with tetrahydrofuran, and imidazole and 1-bromo-2-(2-methoxyethoxy)ethane can be added thereto to obtain imidazole harboring an oligoether chain. Likewise, alkylimidazole, trialkylphosphine, trialkylamine, dialkylsulfone, pyridine, N-alkylpyrrolidine, or the like can be obtained so as to have various functional groups. Such a cation can be reacted with a reagent for the anion moiety to obtain the desired aprotic zwitterion.

The agent for promoting undifferentiation of the present embodiment can be added, for use, to cells themselves or a vehicle, for example, a phosphate buffer, water, or various media, containing cells and can thereby promote the undifferentiation of the cells or maintain an undifferentiation state. Various previously known media are applicable to the medium to which the agent for promoting undifferentiation is added, and such a medium is appropriately selected according to the type of cells to be cultured, etc. Any of a synthetic medium, a semisynthetic medium and a natural medium may be used, and both a liquid medium and a solid medium are applicable. Specifically, examples thereof include, but are not limited to, media for bacteria such as YM medium, cornmeal medium, glucose bouillon medium, broth medium, and SIM medium, media for fungi such as oatmeal medium, wort, fermentation test medium, starch production medium, and yeast extracts, LB medium, Davis medium, MS medium, TG medium, and DMEM medium.

The agent for promoting undifferentiation of the present embodiment can be added to a medium or the like, together with various drugs, in order to conduct various assays, etc. Examples of the drug can include, but are not particularly limited to, antitumor agents, antibiotics, antihyperlipidemic agents, antimicrobial agents, therapeutic agents for allergic diseases, therapeutic agents for hypertension, therapeutic agents for arteriosclerosis, blood circulation promoting agents, hormone agents, lipid-soluble vitamins, therapeutic agents for diabetes mellitus, anti-androgenic agents, cardiotonic drugs, drugs for arrhythmia, anti-inflammatory agents, hypnotic sedatives, tranquilizers, antiepileptic agents, antidepressants, therapeutic agents for digestive system diseases, diuretic drugs, local anesthetics, anticoagulants, antihistaminic agents, antimuscarinic agents, anti-mycobacterial agents, immunosuppressants, antithyroid agents, antiviral agents, anxiety alleviating sedatives, styptics, β-adrenoreceptor blockades, myocardial inotropic agents, contrast agents, corticosteroid, cough suppressive agents, diagnostic agents, imaging agents for diagnosis, diuretics, dopamine agonists, lipid regulating agents, muscle relaxers, parasympathetic agonists, thyroid calcitonin, prostaglandin, radioactive medicaments, sex hormone, stimulants, anorexiants, sympathetic agent, antithyroid agents, vasodilators, isoflavone, and xanthene.

The concentration of the aprotic zwitterion to be added to the medium can be appropriately set according to the type of cells to be cultured in the medium, etc. The agent for promoting undifferentiation comprising the aprotic zwitterion according to the present embodiment has low toxicity to cells and can therefore be added at a high concentration, if necessary. Specifically, the aprotic zwitterion can be added such that the final concentration in the medium is a concentration of 0.001 to 100 w/v %, preferably 0.01 to 90 w/v %, though the concentration is not limited to this range.

The cells that may be cultured in the medium are not particularly limited by their type, and arbitrary cells are applicable. Examples thereof include animal cells, insect cells, plant cells, yeast cells, and bacterial cells. Examples of the animal cells include cells of humans, mice, rats, monkeys, pigs, dogs, sheep or goat. Examples of the bacterium include lactic acid bacteria, *E. coli, Bacillus subtilis*, and cyanobacteria.

The cells are not particularly limited by their type and are appropriately selected from the group consisting of, for example, pluripotent stem cells, tissue stem cells, somatic cells and germ cells. In this context, the "pluripotent stem cells" are a generic name for stem cells having the ability to differentiate into cells of every tissue (pluripotent differentiation) and include embryonic stem cells (ES cells), induced pluripotent stem cells (iPS cells), embryonic germ stem cells (EG cells), germ stem cells (GS cells), and the like. ES cells or iPS cells are preferred.

The "tissue stem cells" mean stem cells having the ability to differentiate into diverse cell species (multipotent differentiation), though the cell lineages into which the cells are capable of differentiating are limited by particular tissues. Examples thereof include hematopoietic stem cells in the bone marrow, neural stem cells, hepatic stem cells, and skin stem cells.

The "somatic cells" refer to cells other than germ cells among cells constituting multicellular organisms. Preferably, examples thereof include osteoclasts, fibroblasts, hepatocytes, pancreatic cells, myocytes, osteocytes, osteoblasts, chondrocytes, fat cells, skin cells, pancreatic cells, renal cells, lung cells, lymphocytes, erythrocytes, leucocytes, monocytes, and macrophages.

Examples of the "germ cells" include gametes for sexual reproduction, i.e., the ovum, oocytes, sperm, and androcytes, and spores for asexual reproduction.

The cells may be selected from the group consisting of sarcoma cells, an established cell line and transformed cells. The "sarcoma" is a cancer that develops in connective tissue cells derived from non-epithelial cells such as bone, cartilage, fat, muscle, and blood, and includes soft tissue sarcoma and malignant bone tumor. The sarcoma cells are cells derived from sarcoma. The "established cell line" means cultured cells that have constant stable properties through ex vivo maintenance over a long period and are capable of being permanently subcultured. Examples thereof include PC12 cells (derived from rat adrenal medulla), CHO cells (derived from the Chinese hamster ovary), HEK293 cells (derived from the human embryonic kidney), HL-60 cells (derived from human leukocytes), and HeLa cells (derived from human uterine cervical cancer). The "transformed cells" mean cells whose genetic properties have been changed by the transfer of a nucleic acid (DNA, etc.) from the outside of the cells. Animal cells, plant cells, or bacteria are transformed by use of previously known methods.

The culture of ES cells or iPS cells may involve, if necessary, feeder cells which are accessorily used for creating an environment necessary for cell proliferation or differentiation. Examples of the feeder cells include mouse fibroblasts. These feeder cells can be treated in advance with gamma ray irradiation or an antibiotic so as not to proliferate.

(Cryoprotective Agent)

Next, the cryoprotective agent according to the present invention will be described. The cryoprotective agent according to one embodiment of the present invention comprises an aprotic zwitterion. A protic zwitterion refers to a zwitterion that is capable of losing a charge within the molecule via proton movement in principle, and almost all of natural zwitterions such as amino acids correspond thereto. By contrast, a zwitterion that has no proton movable between an anion and a cation within the molecule under usual mild conditions is defined as an aprotic zwitterion and rarely occurs naturally. Examples of such an aprotic zwitterion can include a substance in which an ionic liquid-like cation site and an ionic liquid-like anion site are linked via a covalent bond. Preferably, the cation site and the anion site of the aprotic zwitterion are connected via one or more alkylene groups each having 1 to 5 carbon atoms and optionally having one or more heteroatoms in the molecular chain. In this context, examples of the heteroatom include oxygen, nitrogen, sulfur, and phosphorus. The alkylene group thus having 1 to 5 carbon atoms can weaken the toxicity of the zwitterion to cells.

It is generally known that organic ions, particularly, organic ions accepted as ionic liquids (organic salts containing a cation such as an imidazolium cation, a phosphonium cation, an ammonium cation, a sulfonium cation, a pyrazolium cation, a pyridinium cation, a pyrrolidinium cation, a morpholinium cation, a cyclopropenylium cation, or a piperidinium cation), exhibit toxicity through the insertion of the alkyl chain (which may contain a heteroelement) of the cation to cell membranes (Lim, G. S., Zidar, J., Cheong, D. W., Jaenicke, S. & Klahn, M. Impact of ionic liquids in aqueous solution on bacterial plasma membranes studied with molecular dynamics simulations. J. Phys. Chem. B 118, 10444-10459 (2014)). This process is composed of the following two stages.
(1) The cation of an organic salt comes close to the phosphoric acid of a lipid bilayer (cell membrane) through electrostatic interaction.
(2) The alkyl chain of the cation of the organic salt interacts hydrophobically with the lipid site of the lipid bilayer so that the alkyl chain of the cation is inserted to the lipid bilayer to disrupt the cell membrane.

The present inventors have found it possible to suppress toxicity by introducing a very highly polar anion to the end of the alkyl chain of the cation to prepare an aprotic zwitterion. Specifically, the introduction of such an anion causes electrostatic repulsion between the phosphoric acid and the anion and can thereby inhibit the stage (1). Also, the introduction of the anion very highly increases polarity and can thereby suppress the hydrophobic interaction in the stage (2). Hence, the toxicity of the organic salt containing a cation such as imidazolium, phosphonium, ammonium, sulfonium, pyridinium, or pyrrolidinium can be drastically reduced.

In the present embodiment, examples of the ionic liquid cation of the aprotic zwitterion include an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation having one or more substituents. Among them, an imidazolium cation and a phosphonium cation each having substituent(s) are preferably used. The respective substituents may be the same as or different from each other and can be appropriately selected from, for example, an alkyl group having 1 to 18 carbon atoms and optionally having one or more heteroatoms in the molecular chain, and an alkoxy group having 1 to 18 carbon atoms. Particularly, the substituents are preferably one or more alkyl groups each having 1 to 8 carbon atoms and optionally having one or more heteroatoms in the molecular chain. The alkyl chain thus having 1 to 8 carbon atoms can further weaken toxicity to cells. In this context, examples of the heteroatom include oxygen, nitrogen, sulfur, and phosphorus.

Examples of the ionic liquid-like anion of the aprotic zwitterion can include, but are not limited to, a sulfonate ion —$SO_3^-$, a carboxylate ion —$COO^-$, a phosphate ion —$OP=O(H)O^-$, —$OP=O(CH_3)O^-$, and —$OP=O(OR_3)O^-$ (wherein $R_3$ is hydrogen or an alkyl group optionally having a heteroatom in the molecular chain).

Particularly, an aprotic zwitterion represented by the following formula (1):

[Formula 22]

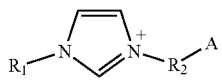

(1)

is preferably used as the aprotic zwitterion contained in the cryoprotective agent. In the formula (1), A is an anion selected from the group consisting of $SO_3^-$, —$COO^-$, —$OP=O(H)O^-$, —$OP=O(CH_3)O^-$ and —$OP=O(OR_3)O^-$ (wherein $R_3$ is hydrogen or an alkyl group optionally having a heteroatom in the molecular chain). Examples of the heteroatom include oxygen, nitrogen, sulfur, and phosphorus. Examples of the alkyl group represented by $R_3$ include, but are not limited to, a methyl group, an ethyl group, a propyl group, a butyl group, and a propyl group. Specifically, the aprotic zwitterion contained in the cryoprotective agent according to the present embodiment includes zwitterions represented by the following formulas (2) and (3):

[Formula 23]

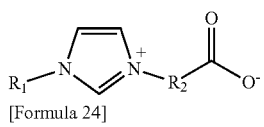

(2)

[Formula 24]

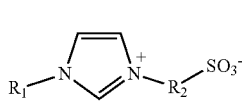

(3)

In the formulas (1) to (3), $R_1$ is an alkyl group having 1 to 8 carbon atoms and optionally containing one or two oxygen atoms in the molecular chain, and $R_2$ is an alkylene group having 3 to 5 carbon atoms. Specific examples of $R_1$ include a methyl group, an ethyl group, a propyl group, a butyl group, a pentyl group, $CH_3OCH_2CH_2$—, and $CH_3OCH_2CH_2OCH_2CH_2$—. Specific examples of $R_2$ include, but are not limited to, a propylene group, a butylene group, and a pentylene group.

Particularly, the following aprotic zwitterions have low toxicity to cells and as such, are each suitably used in the cryoprotective agent.

[Formula 25]

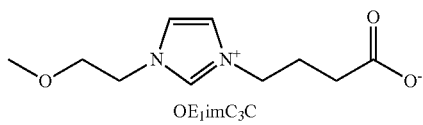

OE$_1$imC$_3$C

[Formula 26]

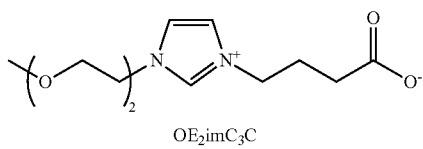

OE$_2$imC$_3$C

[Formula 27]

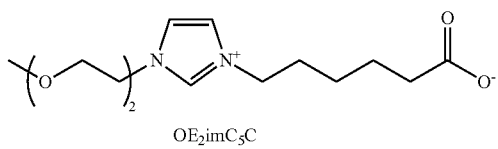

OE$_2$imC$_5$C

[Formula 28]

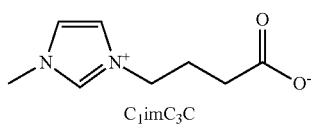

C$_1$imC$_3$C

[Formula 29]

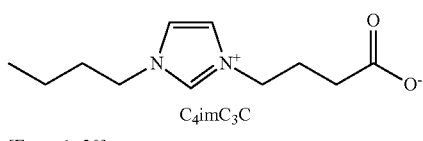

C$_4$imC$_3$C

[Formula 30]

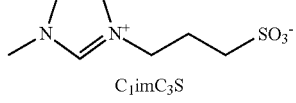

C$_1$imC$_3$S

[Formula 31]

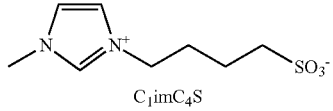

C$_1$imC$_4$S

[Formula 32]

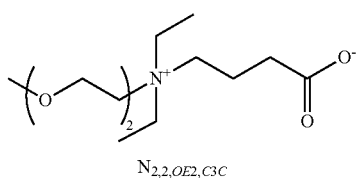

N$_{2,2,OE2,C3C}$

[Formula 33]

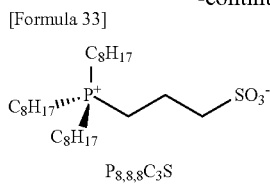

P₈,₈,₈C₃S

The aprotic zwitterion as described above can be synthesized by appropriately adopting an organic synthesis method general for those skilled in the art. Specifically, as for an aprotic zwitterion in which the cation represented by the formula (1) is an imidazolium ion, for example, 1-alkylimidazole and ethyl bromoalkylate are refluxed in acetonitrile, and the resultant is mixed with an anion exchange resin. Then, the solvent can be distilled off under reduced pressure to obtain an aprotic zwitterion consisting of imidazolium and carboxylate. The alkyl group on imidazole may contain one or more heteroatoms, for example, one or two oxygen atoms. Also, an aprotic zwitterion having a cation other than the imidazolium cation can be synthesized by changing the 1-alkylimidazole to trialkylphosphine, trialkylamine, dialkylsulfone, pyridine, N-alkylpyrrolidine, or the like. Alternatively, NaH is mixed with tetrahydrofuran, and imidazole and 1-bromo-2-(2-methoxyethoxy)ethane can be added thereto to obtain imidazole harboring an oligoether chain. Likewise, alkylimidazole, trialkylphosphine, trialkylamine, dialkylsulfone, pyridine, N-alkylpyrrolidine, or the like can be obtained so as to have various functional groups. Such a cation can be reacted with a reagent for the anion moiety to obtain the desired aprotic zwitterion.

The cryoprotective agent comprising the aprotic zwitterion as described above can be used as a substitute for a conventional cryoprotective agent such as DMSO or glycerol. Specifically, the cryoprotective agent of the present embodiment is added to a cell suspension or cells recovered by centrifugation, which can then be frozen in a freezer (slow freezing method). The cryoprotective agent of the present embodiment can be used in the cryopreservation of cells in various fields, such as the cryopreservation of an established cell line in a cell bank, the preservation of the species in the livestock raising industry, the cryopreservation of sperm, eggs, and fertilized eggs for the increased production of livestock, or the cryopreservation of germ cells in reproductive medicine, and can maintain a high survival rate after thawing. In the slow freezing method, the concentration of the aprotic zwitterion to be added to the cell suspension or the cells recovered by centrifugation can be appropriately set according to the type of the cells, etc. The cryoprotective agent comprising the aprotic zwitterion according to the present embodiment has lower toxicity to cells than that of DMSO or the like and can therefore be added at a high concentration, if necessary. Specifically, the aprotic zwitterion can be added such that the concentration in the cell suspension is 0.1 to 90% by weight, though the concentration is not limited to this range.

In the slow freezing method, the cryoprotective agent of the present embodiment can be mixed, for use, with a conventional compound for cryoprotection such as DMSO, glycerol, sucrose, trehalose, propylene glycol, or acetamide, if necessary. The content of such a compound in the cryoprotective agent of the present embodiment is preferably, for example, less than 30% by weight, because too large an amount of the compound increases toxicity to cells. Also, the cryoprotective agent of the present embodiment may be appropriately mixed with serum or a protein or a peptide purified from serum, if necessary, in order to enhance the survival rate of cells. Examples of such a protein or a peptide can include one or more members selected from bovine serum albumin, carboxylated polylysine, and antifreeze proteins and antifreeze glycoproteins as found in insects, plants, fish, etc. The content of such a protein or a peptide in the cryoprotective agent of the present embodiment differs depending on the type of the protein or the peptide and can be, for example, less than 20% by weight. However, the aprotic zwitterion according to the present embodiment can be used in itself as a cryoprotective agent that offers a high survival rate of cells, without being used in combination with the protein or the peptide, and therefore has no risk of being contaminated with viruses or the like and can circumvent rejection in regenerative medicine.

The cell freezing conditions in the slow freezing method can be appropriately set in accordance with conventional conditions. Specifically, the cells can be cooled to 0 to −200° C., for example, at a cooling rate of −0.1 to −15° C./min, though the conditions differ depending on the concentration of the aprotic zwitterion in a cell suspension, etc.

When ice crystal formation inside or outside cells when freezing has large influence, as in human ES cells, iPS cells, fertilized eggs, or the like, the cells can be frozen by a rapid freezing method (vitrification method) instead of the slow freezing method. In the rapid freezing method, the concentration of the cryoprotective agent of the present embodiment in a cell suspension is elevated, and the cooling rate is increased. Specifically, the concentration of the cryoprotective agent of the present embodiment in a cell suspension is preferably 0.5 to 90% by weight, the cooling rate is preferably −15 to −20000° C./min, and the cooling temperature is preferably in the range of 0 to −200° C. In general, a higher concentration of a cryoprotective agent facilitates vitrification, whereas elevating osmotic pressure and also increasing toxicity to cells. The aprotic zwitterion according to the present embodiment has relatively low toxicity, and therefore can have a high concentration and is suitable as a cryoprotective agent for use in the rapid freezing method.

The cells to be frozen are not particularly limited by their type, and arbitrary cells are applicable. Examples thereof include animal cells, insect cells, plant cells, yeast cells, and bacterial cells. Examples of the animal cells include cells of humans, mice, rats, monkeys, pigs, dogs, sheep or goat. Examples of the bacterium include lactic acid bacteria, *E. coli*, *Bacillus subtilis*, and cyanobacteria.

The cells are not particularly limited by their type and are appropriately selected from the group consisting of, for example, pluripotent stem cells, tissue stem cells, somatic cells and germ cells. In this context, the "pluripotent stem cells" are a generic name for stem cells having the ability to differentiate into cells of every tissue (pluripotent differentiation) and include embryonic stem cells (ES cells), induced pluripotent stem cells (iPS cells), embryonic germ stem cells (EG cells), germ stem cells (GS cells), and the like. ES cells or iPS cells are preferred.

The "tissue stem cells" mean stem cells having the ability to differentiate into diverse cell species (multipotent differentiation), though the cell lineages into which the cells are capable of differentiating are limited by particular tissues. Examples thereof include hematopoietic stem cells in the bone marrow, neural stem cells, hepatic stem cells, and skin stem cells.

The "somatic cells" refer to cells other than germ cells among cells constituting multicellular organisms. Preferably, examples thereof include osteoclasts, fibroblasts, hepatocytes, pancreatic cells, myocytes, osteocytes, osteoblasts, chondrocytes, fat cells, skin cells, pancreatic cells, renal cells, lung cells, lymphocytes, erythrocytes, leucocytes, monocytes, and macrophages.

Examples of the "germ cells" include gametes for sexual reproduction, i.e., the ovum, oocytes, sperm, and androcytes, and spores for asexual reproduction.

The cells may be selected from the group consisting of sarcoma cells, an established cell line and transformed cells. The "sarcoma" is a cancer that develops in connective tissue cells derived from non-epithelial cells such as bone, cartilage, fat, muscle, and blood, and includes soft tissue sarcoma and malignant bone tumor. The sarcoma cells are cells derived from sarcoma. The "established cell line" means cultured cells that have constant stable properties through ex vivo maintenance over a long period and are capable of being permanently subcultured. Examples thereof include PC12 cells (derived from rat adrenal medulla), CHO cells (derived from the Chinese hamster ovary), HEK293 cells (derived from the human embryonic kidney), HL-60 cells (derived from human leukocytes), and HeLa cells (derived from human uterine cervical cancer). The "transformed cells" mean cells whose genetic properties have been changed by the transfer of a nucleic acid (DNA, etc.) from the outside of the cells. Animal cells, plant cells, or bacteria are transformed by use of previously known methods.

(Medium for Cryopreservation)

The medium for cryopreservation according to the present invention will be described. The medium for cryopreservation according to the present invention comprises an aprotic zwitterion represented by the general formula (4):

In the formula, $R_4$ is an alkyl group having 1 to 7 carbon atoms, an alkenyl group having 1 to 7 carbon atoms, or an alkyl group having 1 to 7 carbon atoms and containing an ether bond, X is a cation moiety of the zwitterion and represents a cation selected from the group consisting of an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation, A represents an anion moiety and represents an anion selected from the group consisting of $SO_3^-$, $-COO^-$, $-OP=O(H)O^-$, $-OP=O(CH_3)O^-$ and $-OP=O(OR_3)O^-$, $R_2$ is an alkylene group having 1 to 5 carbon atoms and optionally having a substituent, and $R_3$ is hydrogen or an alkyl group optionally having a heteroatom in the molecular chain. The "alkyl group having 1 to 7 carbon atoms and containing an ether bond" means an alkyl group having 1 to 7 carbon atoms and containing one or more (e.g., one or two) oxygen atoms in the molecular chain.

In the general formula (4), preferably, X has a cyclic structure having 1 to 6 carbon atoms and containing one or two or more nitrogen atoms and has one or two or more substituents on the nitrogen atom(s), A is a carboxyl group or a sulfonate group, the cation is present on nitrogen or non-localized in the whole X, and the anion is present on the carboxyl group or the sulfonate group.

In the medium for cryopreservation of the present embodiment, the aprotic zwitterion is represented by the following formula (1):

[Formula 34]

(1)

wherein A is an anion selected from the group consisting of $SO_3^-$, $-COO^-$, $-OP=O(H)O^-$, $-OP=O(CH_3)O^-$ and $-OP=O(OR_3)O^-$, $R_1$ is an alkyl group having 1 to 7 carbon atoms, an alkenyl group having 1 to 7 carbon atoms, or an alkyl group having 1 to 7 carbon atoms and containing an ether bond, $R_2$ is an alkylene group having 3 to 5 carbon atoms, and $R_3$ is hydrogen or an alkyl group optionally having a heteroatom in the molecular chain.

In the medium for cryopreservation of the present embodiment, the aprotic zwitterion is represented by the following formula (2) or (3):

[Formula 35]

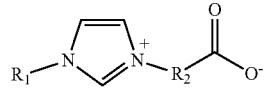

(2)

[Formula 36]

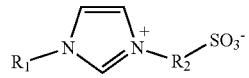

(3)

wherein $R_1$ and $R_2$ are as defined in the formula (1).

$R_1$ or $R_4$ is preferably an alkenyl group having 1 to 7 carbon atoms.

Examples of such an aprotic zwitterion can include those given below. Particularly, as for an agent for promoting undifferentiation, the following aprotic zwitterions have low toxicity to cells and as such, are suitably used.

[Formula 37]

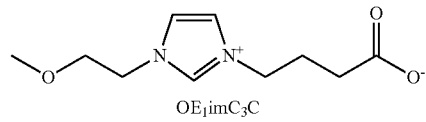

OE₁imC₃C

[Formula 38]

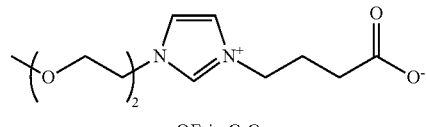

OE₂imC₃C

[Formula 39]

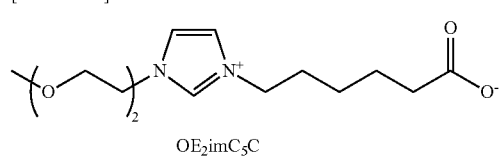

OE₂imC₅C

-continued

[Formula 40]
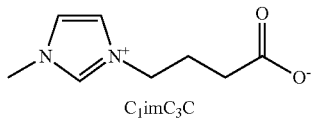
C₁imC₃C

[Formula 41]
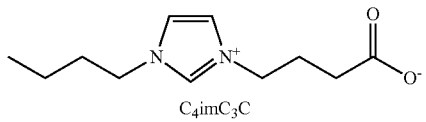
C₄imC₃C

[Formula 42]
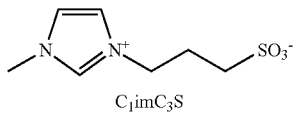
C₁imC₃S

[Formula 43]
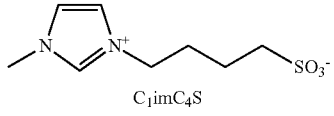
C₁imC₄S

[Formula 44]
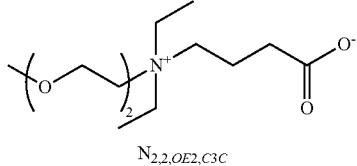
N₂,₂,OE2,C3C

[Formula 45]
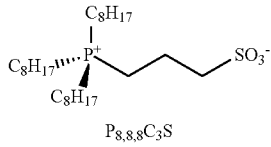
P₈,₈,₈C₃S

The medium for cryopreservation according to another embodiment of the present invention comprises an aprotic zwitterion represented by the general formula (5):

$$R_{4'}-X'-R_{2'}-A' \quad (5)$$

wherein
- $R_{4'}$ is an alkyl group having 1 to 10 carbon atoms, an alkenyl group having 1 to 7 carbon atoms, or an alkyl group having 1 to 7 carbon atoms and containing one or two oxygen atoms in the molecular chain,
- X' represents a cation selected from the group consisting of an imidazolium cation, a phosphonium cation, an ammonium cation, a sulfonium cation, a pyrazolium cation, a pyridinium cation, a pyrrolidinium cation, a morpholinium cation, a cyclopropenylium cation and a piperidinium cation,
- A' represents an anion selected from the group consisting of $SO_3^-$, $-COO^-$, $-OP=O(H)O^-$, $-OP=O(CH_3)O^-$ and $-OP=O(OR_3)O^-$,
- $R_{2'}$ is an alkylene group having 1 to 5 carbon atoms and optionally having a substituent, and
- $R_{3'}$ is hydrogen or an alkyl group optionally having a heteroatom in the molecular chain.

In the medium for cryopreservation according to another embodiment of the present invention, examples of the aprotic zwitterion represented by the general formula (5) can include those given below. The medium for cryopreservation of the present embodiment can comprise at least one aprotic zwitterion selected from the following.

[Formula 46]
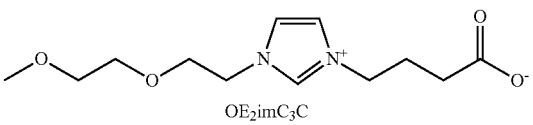
OE₂imC₃C

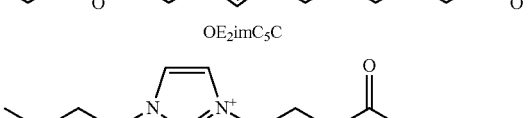
OE₂imC₅C

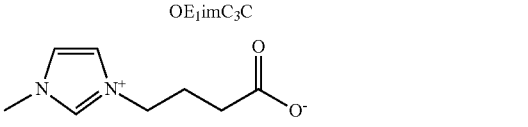
OE₁imC₃C

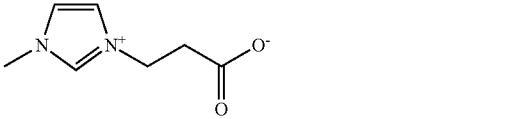
C₁imC₃C

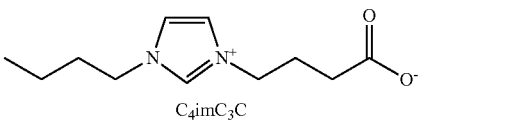
C₁imC₂C

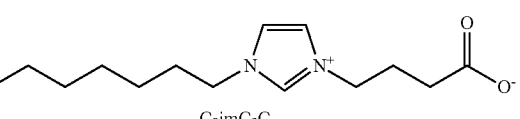
C₄imC₃C

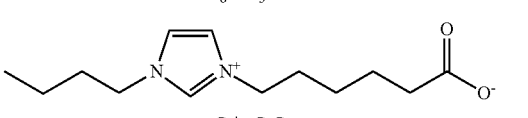
C₈imC₃C

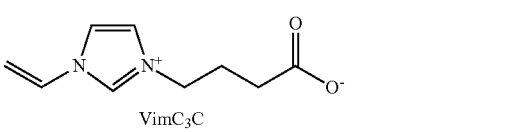
C₄imC₅C

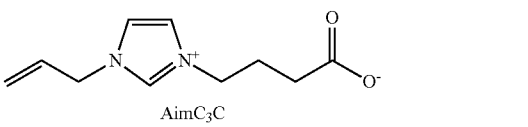
VimC₃C

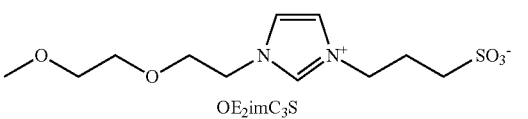
AimC₃C

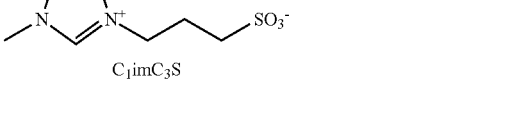
OE₂imC₃S

C₁imC₃S

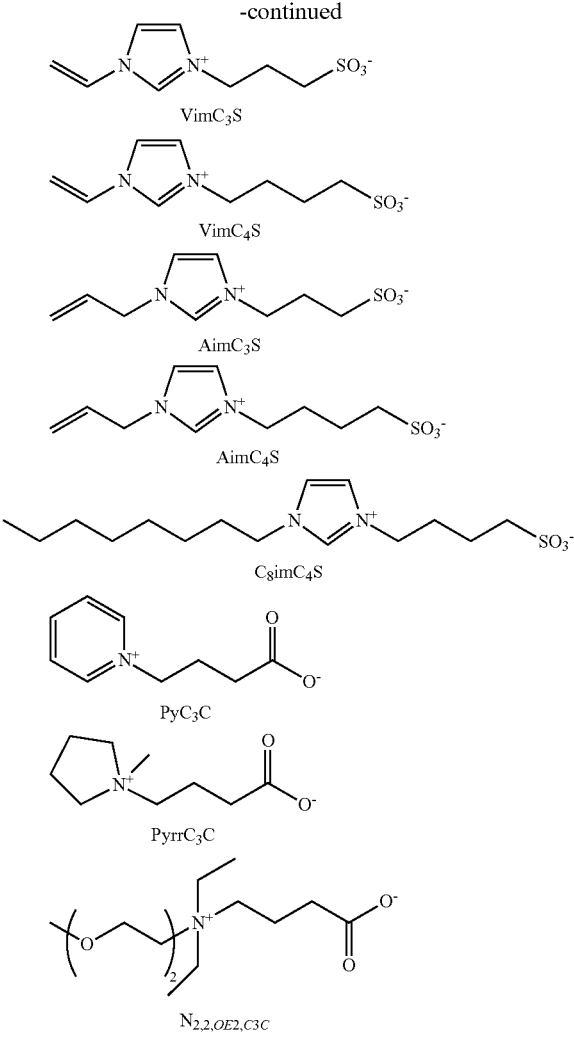

The aprotic zwitterion as described above can be synthesized by appropriately adopting an organic synthesis method general for those skilled in the art.

The aprotic zwitterion represented by the formula (4) or the formula (5) can be used as a medium for cryopreservation in combination with water. For example, the aprotic zwitterion can be used in the form of a composition comprising the aprotic zwitterion and water or a composition consisting of the aprotic zwitterion and water as a medium for cryopreservation. The composition comprising the aprotic zwitterion and water may comprise one or more cell-permeable substances, for example, glycerin, dimethyl sulfoxide (DMSO), ethylene glycol, and propylene glycol. The composition comprising the aprotic zwitterion and water may not comprise a nutrient (e.g., a saccharide for the proliferation of cells) or a peptide or a protein (e.g., serum or a protein or a peptide purified from serum). Particularly, the composition comprising the aprotic zwitterion and water may not comprise the nutrient, the peptide or the protein when the composition acts as a cryopreserving agent.

Thus, the present invention relates to a medium for cryopreservation comprising an aprotic zwitterion represented by the formula (4) or the formula (5) and water, and a medium for cryopreservation consisting of an aprotic zwitterion represented by the formula (4) or the formula (5) and water. The present invention further relates to a cryopreserving agent comprising an aprotic zwitterion represented by the formula (4) or the formula (5).

The aprotic zwitterion according to the present invention may be used in the form of a composition consisting of only the aprotic zwitterion and water as a medium for cryopreservation. The medium for cryopreservation may be used at any level of a cell, a tissue and an individual. The cryopreserving agent according to the present invention can be used as a medium for cryopreservation without being further supplemented with a peptide, a protein, or the like.

Such a medium for cryopreservation consisting of the aprotic zwitterion and water according to the present invention may be supplemented with a conventional cell-permeable substance as an additive. In this context, any cell-permeable substance can be used as an additive as long as the substance is used as an additive for media as a conventional cryopreserving agent. Examples of such a substance can specifically include glycerin, dimethyl sulfoxide (DMSO), ethylene glycol, and propylene glycol.

Thus, the medium for cryopreservation or the cryopreserving agent according to the present invention can be used alone without the need of being mixed with, for example, serum or a protein or a peptide purified from serum, and therefore has no risk of being contaminated with viruses or the like and can circumvent rejection in regenerative medicine. Furthermore, the medium for cryopreservation or the cryopreserving agent according to the present invention also eliminates the need of adding a nutrient such as a saccharide necessary for cell proliferation and is therefore capable of reducing the influence of microbes.

In the case of using a composition comprising the aprotic zwitterion and water or a composition consisting of the aprotic zwitterion and water as a medium for cryopreservation, the aprotic zwitterion is used at usually 1% by weight or more, preferably 5% by weight or more, with respect to the composition and used at usually 30% by weight or less, preferably 20% by weight or less, more preferably 15% by weight or less, in terms of the upper limit.

A cell-permeable substance can be additionally used as an additive with respect to 100 parts by weight of the composition comprising the aprotic zwitterion and water or the composition consisting of the aprotic zwitterion and water (also referred to as an aqueous solution of the aprotic zwitterion) as a medium for cryopreservation. The cell-permeable substance can be added, for use, at usually at least 1 part by weight, preferably 10 parts by weight or more, per 100 parts by weight of the aqueous solution of the aprotic zwitterion and at usually 30 parts by weight or less, preferably 20 parts by weight or less, more preferably 15 parts by weight or less, in terms of the upper limit. In the present specification, the case of being added at 1 part by weight per 100 parts by weight of the aqueous solution of the aprotic zwitterion is also referred to as 1% with respect to the aqueous solution of the aprotic zwitterion.

The present invention also relates to an agent for promoting undifferentiation for a cell, a tissue or an individual; an agent for cryopreserving a cell, a tissue or an individual; an agent for inhibiting ice crystal formation; an agent maintaining undifferentiation; a vitrifying agent; a freeze drying agent; a dehydrating agent for a cell, a tissue or an individual; an agent for low-temperature (which is equal to or lower than ordinary temperature) preservation of a cell, a tissue or an individual; and a solution for low-temperature (which is equal to or lower than ordinary temperature) transport of a cell, a tissue or an individual, comprising an aprotic zwitterion represented by the formula (4) or the formula (5).

The type of the aprotic zwitterion used in the present invention can be appropriately selected according to the origin or type of cells to be preserved. Those skilled in the art can appropriately select the type of the aprotic zwitterion, the concentration thereof, etc. It is considered that an aprotic zwitterion such as $C_1imC_2C$, $C_1imC_3C$, or $C_1imC_5C$ can be used in almost the same manner between mouse epithelial fibroblast-derived cells and human kidney-derived cells. As for the toxicity of $C_1imC_3C$ or $C_1imC_5C$, the human kidney-derived cells differ in sensitivity to concentration. $VimC_3C$, $VimC_3S$, $Vim_4C$, $VimC_4S$, $AimC_3C$, $AimC_3S$, $AimC_4S$, or the like is expected to be more effective for the human kidney cell-derived cells in relative evaluation to $OE_2imC_3C$.

The medium comprising the aprotic zwitterion used in the present invention has very small influence on cell functions. For example, DMSO, which has heretofore been used as an additive, has large influence on cell cycles, whereas the aprotic zwitterion used in the present invention has little influence on cell cycles. In the case of using the aprotic zwitterion in a medium for fertilized eggs, unlike the addition of DMSO heretofore used, normal development has been shown. Although not bound by any theory, in the case of adding the aprotic zwitterion used in the present invention to a medium, iPS cells continue to release an undifferentiation marker, presumably, in part because the aprotic zwitterion has no influence on the functions of the iPS cells.

The glass transition temperature (Tg) of the aqueous solution of the aprotic zwitterion, i.e., the composition comprising the aprotic zwitterion and water or the composition consisting of the aprotic zwitterion and water, is −70° C. or lower, preferably −75° C. or lower, more preferably −80° C. (particularly, as an aqueous solution of 10% by weight of the aprotic zwitterion). In the case of using the aprotic zwitterion used in the present invention in a medium for cryopreservation or a cryopreserving agent, preferred Tg also differs depending on a material to be cryopreserved. Generally, the glass transition temperature is reached in a supercooling state where crystal growth is minimized at a temperature equal to or lower than the melting temperature, and preferably the glass state is preserved even at a lower temperature. A medium comprising the aprotic zwitterion with appropriate Tg can be selected in relation to the Tg of a preservation sample itself and preservation temperature. In this way, the quality of preservation can be altered by selecting an appropriate medium.

Although not bound by any theory, the difference between a DMSO-based medium heretofore used and the aprotic zwitterion used in the present invention is probably due to the difference in cell permeability (e.g., Golan, M. et al., Afm monitoring the influence of selected cryoprotectants on regeneration of cryopreserved cells mechanical properties. Front Physiol 9, 804 (2018)). Specifically, it is considered that DMSO or glycerin enters into cells, whereas the aprotic zwitterion used in the present invention does not enter into cells. Whether permeation through cell membranes occurs can be found by computer simulation. The present invention enables cells to be preserved without influencing cell functions, in part because the aprotic zwitterion differs in cell permeability from additives for preservation heretofore used. Although not bound by any theory, the aprotic zwitterion of the present invention is suitable for cryopreservation and has no influence on cell functions when used as a medium, presumably because the aprotic zwitterion does not permeate cell membranes, for example, whereby: the outside of the cells is a hypertonic liquid so that free water from the inside of the cells is ejected thereto to minimize the intracellular formation of ice crystals by free water; and outside the cells, the electrostatic effect of the aprotic zwitterion promotes the extracellular structuring of water and again prevents the formation of large ice crystals.

The aprotic zwitterion according to the present invention, even if supplemented with glycerin or dimethyl sulfoxide heretofore used, can exhibit preservative performance equivalent to that of commercially available products.

EXAMPLES

Next, the present invention will be described in more detail with reference to Examples and Comparative Examples. However, the present invention is not limited by these Examples.

(Cell)

Human normal fibroblasts 1 (hNF-1) were purchased from Kurabo Industries Ltd. Human normal fibroblasts 2 (hNF-2) used were established from human lung cancer cells MDA-MB-231 (obtained from professor Erik Sahai of Francis Crick Institute, UK). Mouse normal fibroblasts (mNF) used were established from a C57BL/6-EGFP mouse. Human renal cells were obtained from professor Erik Sahai of Francis Crick Institute, UK.

(Evaluation Substance)

The aprotic zwitterion used in the present invention can be produced with reference to J. Am. Chem. Soc. 139, 16052-16055 (2017).

(Synthesis Example 1)$OE_2imC_3C$

[Formula 47]

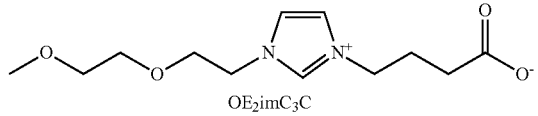

$OE_2imC_3C$ 15.7 g (656 mmol) of NaH (Kanto Chemical Co., Inc.) was suspended in 50 mL of tetrahydrofuran (FUJIFILM Wako Pure Chemical Corp.). To the suspension, 13.8 g (202 mmol) of imidazole (Tokyo Chemical Industry Co., Ltd.) was added, and the mixture was stirred at room temperature for 24 hours. 37.0 g (202 mmol) of 1-bromo-2-(2-methoxyethoxy)ethane (Tokyo Chemical Industry Co., Ltd.) was added thereto, and the mixture was stirred at 70° C. for 6 hours. White precipitates were filtered off, and the filtrate was concentrated and then distilled (125° C., 1 mmHg) to obtain 1-(2-(2-methoxyethoxy)ethyl)imidazole. This compound was dissolved in 250 mL of acetonitrile. To the solution, 29 g (150 mmol) of ethyl 4-bromobutyrate was added, and the mixture was refluxed at 80° C. for 16 hours. The resultant was washed with diethyl ether and then applied to a column of an anion exchange resin (Amberlite IRN 78A). The eluate was distilled off under reduced pressure to obtain $OE_2imC_3C$.

NMR data: δ=2.13-2.27 (4H, m, CH2CO and CH2CH2CO), 3.37 (3H, s, CH3O), 3.51-3.65 (4H,m, CH3OCH2CH2), 3.86 (2H, t, J=3.6 Hz, OCH2CH2N), 4.40 (2H, t, J=6.7 Hz, NCH2CH2CH2COO), 4.66 (2H, t, J=3.7 Hz, OCH2CH2N), 7.29 and 7.49 (2H, t, J=both 1.6 Hz, NCHCHN), 11.00 (1H, s, NCHN). 13C NMR (100 MHz; CDCl3; Me4Si) δ=27.20 and 34.30 (NCH2CH2CH2COO), 48.94 (OCH2CH2N), 49.47 (NCH2CH2CH2COO), 58.65

(CH3O), 69.19 (OCH2CH2N), 69.93 and 71.29 (OCH2CH2O), 121.22 and 122.58 (NCHCHN), 138.73 (NCHN), 176.63 (CH2COO). Elemental analysis: OE2imC3C·2.5H2O (Found: C, 48.0; H, 8.4; N, 9.3. Calc. for C12H25N2O6.5: C, 47.8; H, 8.4; N, 9.3%).

(Synthesis Example 2) OE$_2$imC$_5$C

[Formula 48]

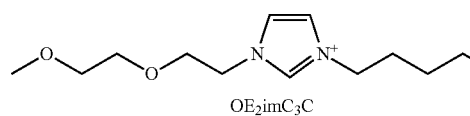

OE$_2$imC$_3$C

The aprotic zwitterion OE$_2$imC$_5$C was synthesized by the same procedures as in Synthesis Example 1 except that ethyl 4-bromobutyrate in Synthesis Example 1 was changed to ethyl 6-bromohexanoate.

(Synthesis Example 3) OE$_1$imC$_3$C

[Formula 49]

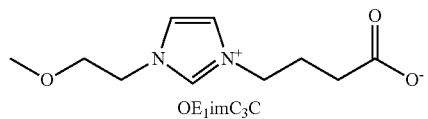

OE$_1$imC$_3$C

The aprotic zwitterion OE$_1$imC$_3$C was synthesized by the same procedures as in Synthesis Example 1 except that 1-bromo-(2-methoxy)ethane was used instead of 1-bromo-2-(2-methoxyethoxy)ethane in Synthesis Example 1.

(Synthesis Example 4) C$_1$imC$_3$C

[Formula 50]

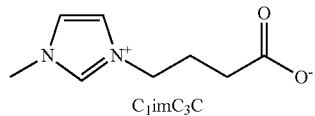

C$_1$imC$_3$C 22.2 g (270 mmol) of 1-methylimidazole and ethyl 4-bromobutyrate (53.7 g: 270 mmol) were dissolved in 20 mL of acetonitrile, and the solution was stirred at 50° C. for 5 hours. After removal of precipitates, the resultant was dried under reduced pressure, washed with diethyl ether three times, and dried under reduced pressure. The residue was applied to an anion exchange resin to obtain C$_1$imC$_3$C. 1H NMR (400 MHz; DMSO-d6; Me4Si) δ=1.77 (2H, t, J=6.4 Hz, CH2CO), 1.86 (2H, J=7.3 Hz, quin, CH2CH2CO), 3.82 (3H, s, CH3N), 4.13 (2H, t, J=6.8 Hz, NCH2CH2), 7.66 and 7.76 (2H, t, J=both 1.6 Hz, NCHCHN), 9.50 (1H, s, NCHN). 13C NMR (100 MHz; DMSO-d6; Me4Si) δ=27.80 (CH2CH2CO), 35.36 (CH2CO), 36.10 (CH3N), 49.61 (NCH2CH2), 122.91 and 123.89 (NCHCHN), 137.700 (NCHN), 174.02 (CH2COO).

(Synthesis Example 5) C$_1$imC$_2$C

[Formula 51]

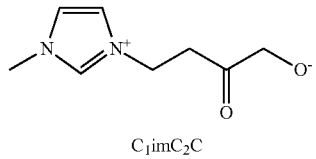

C$_1$imC$_2$C (β-Propiolactone) (FUJIFILM Wako Pure Chemical Corp.) was used instead of ethyl 4-bromobutyrate in Synthesis Example 4. The resulting solution was stirred at 80° C. for 16 hours in water. The resultant was dried under reduced pressure, washed with diethyl ether three times, and after removal of by-products with alumina, dried under reduced pressure to obtain C$_1$imC$_2$C.

(Synthesis Example 6) C$_4$imC$_3$C

[Formula 52]

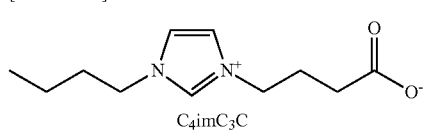

C$_4$imC$_3$C

C$_4$imC$_3$C was synthesized by the same operation as in Synthesis Example 4 except that 4-butylimidazole was used instead of 1-methylimidazole in Synthesis Example 4.

(Synthesis Example 7) C$_8$imC$_3$C

[Formula 53]

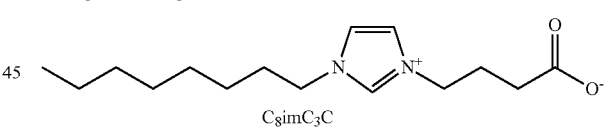

C$_8$imC$_3$C

C$_8$imC$_3$C was synthesized by the same operation as in Synthesis Example 4 except that 4-octylimidazole (Tokyo Chemical Industry Co., Ltd.) was used instead of 1-methylimidazole in Synthesis Example 4.

(Synthesis Example 8) C$_4$imC$_5$C

[Formula 54]

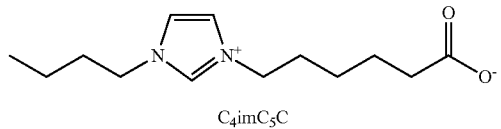

C$_4$imC$_5$C

C$_4$imC$_5$C was obtained by the same operation as in Synthesis Example 4 except that 4-butylimidazole was used instead of 1-methylimidazole; and ethyl 6-bromohexylate (Tokyo Chemical Industry Co., Ltd.) was used instead of ethyl 4-bromobutyrate in Synthesis Example 4.

(Synthesis Example 9) VimC$_3$C

[Formula 55]

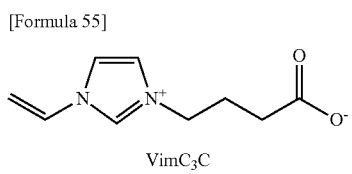

VimC$_3$C

VimC$_3$C was obtained by the same operation as in Synthesis Example 4 except that vinylimidazole (Tokyo Chemical Industry Co., Ltd.) was used instead of 1-methylimidazole in Synthesis Example 4.

(Synthesis Example 10) AimC$_3$C

[Formula 56]

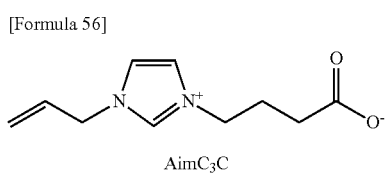

AimC$_3$C

AimC$_3$C was obtained by the same operation as in Synthesis Example 4 except that allylimidazole (Tokyo Chemical Industry Co., Ltd.) was used instead of 1-methylimidazole in Synthesis Example 4.

(Synthesis Example 11) OE$_2$imC$_3$S

[Formula 57]

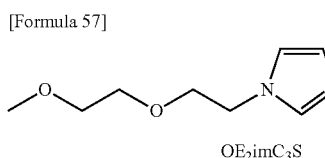

OE$_2$imC$_3$S

The aprotic zwitterion OE$_2$imC$_3$S was obtained by the same procedures as in Synthesis Example 1 except that 1,3-propanesultone was used instead of ethyl 4-bromobutyrate in Synthesis Example 1.

(Synthesis Example 12) C$_1$imC$_3$S

[Formula 58]

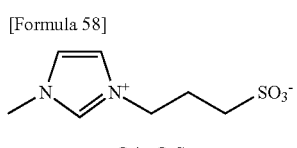

C$_1$imC$_3$S

The aprotic zwitterion C$_1$imC$_3$S was obtained by the same procedures as in Synthesis Example 11 except that 1-methylimidazole was used instead of 1-(2-(2-methoxyethoxy)ethyl)imidazole in Synthesis Example 11.

(Synthesis Example 13) VimC$_3$S

[Formula 59]

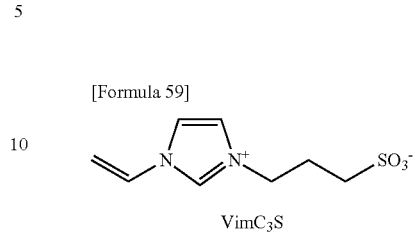

VimC$_3$S

VimC$_3$S was obtained by the same operation as in Synthesis Example 12 except that 1-vinylimidazole was used instead of 1-methylimidazole in Synthesis Example 12.

(Synthesis Example 14) VimC$_4$S

[Formula 60]

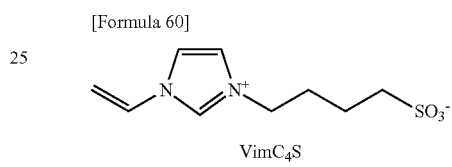

VimC$_4$S

VimC$_4$S was obtained by the same operation as in Synthesis Example 12 except that 1-vinylimidazole (Tokyo Chemical Industry Co., Ltd.) was used instead of 1-methylimidazole; and 1,4-butanesultone (Tokyo Chemical Industry Co., Ltd.) was used instead of 1,3-propanesultone in Synthesis Example 12.

(Synthesis Example 15) AimC$_3$S

[Formula 61]

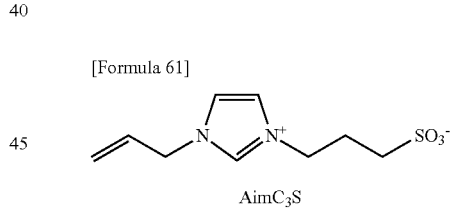

AimC$_3$S

AimC$_3$S was obtained by the same operation as in Synthesis Example 12 except that 1-allylimidazole was used instead of 1-methylimidazole in Synthesis Example 12.

(Synthesis Example 16) AimC$_4$S

[Formula 62]

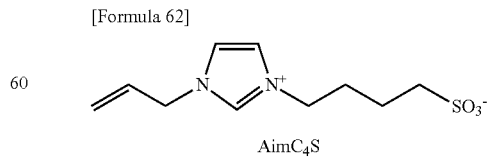

AimC$_4$S

AimC$_4$S was obtained by the same operation as in Synthesis Example 14 except that 1-allylimidazole was used instead of 1-methylimidazole in Synthesis Example 14.

(Synthesis Example 17) C$_8$imC$_4$S

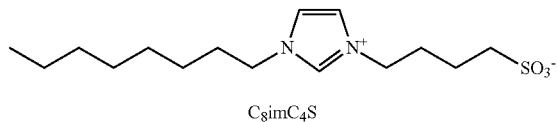

C$_8$imC$_4$S

C$_8$imC$_4$S was obtained by the same operation as in Synthesis Example 14 except that 1-octylimidazole was used instead of 1-methylimidazole in Synthesis Example 14.

(Synthesis Example 18) PyC$_3$C

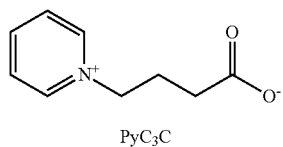

PyC$_3$C

PyC$_3$C was obtained by the same operation as in Synthesis Example 4 except that pyridine (FUJIFILM Wako Pure Chemical Corp.) was used instead of 1-methylimidazole in Synthesis Example 4.

(Synthesis Example 19) PyrrC$_3$C

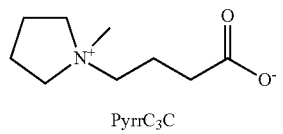

PyrrC$_3$C

PyrrC$_3$C was obtained by the same operation as in Synthesis Example 4 except that pyrrolidine (Tokyo Chemical Industry Co., Ltd.) was used instead of 1-methylimidazole in Synthesis Example 4.

(Synthesis Example 20) N$_{2,2,OE2,C3C}$

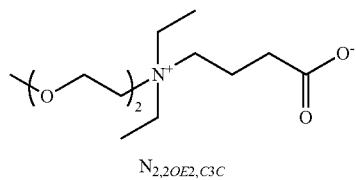

N$_{2,2OE2,C3C}$ 15.7 g (656 mmol) of NaH (Kanto Chemical Co., Inc.) was suspended in 50 mL of tetrahydrofuran (FUJIFILM Wako Pure Chemical Corp.). To the suspension, 14.6 g (200 mmol) of diethylamine (Tokyo Chemical Industry Co., Ltd.) was added, and the mixture was stirred at room temperature for 24 hours. 36.6 g (200 mmol) of 1-bromo-2-(2-methoxyethoxy)ethane (Tokyo Chemical Industry Co., Ltd.) was added thereto, and the mixture was stirred at 70° C. for 6 hours. White precipitates were filtered off, and the filtrate was concentrated and then distilled (125° C., 1 mmHg) to obtain 1-(2-(2-methoxyethoxy)ethyl)imidazole. This compound was dissolved in 250 mL of acetonitrile. To the solution, 29 g (150 mmol) of ethyl 4-bromobutyrate was added, and the mixture was refluxed at 80° C. for 16 hours. The resultant was washed with diethyl ether and then applied to a column of an anion exchange resin (Amberlite IRN 78A). The eluate was distilled off under reduced pressure to obtain N$_{2,2,OE2,C3C}$.

1. Agent for promoting undifferentiation

Example 1

(1) Synthesis of Aprotic Zwitterion OE$_2$imC$_3$C (Test Substance)
(2) Undifferentiation-Specific Gene Expression Analysis
1) Human iPS Cell Culture
1-1) Human iPS Cell Preculture Human iPS cells (RIKEN BRC) were reconstituted on SNL feeder cells (manufactured by Cell Biolabs, Inc.) and cultured in a CO$_2$ incubator (5% CO$_2$, 37° C., wet). On the next day, medium replacement was performed. The medium was replaced with a fresh one every day until 80% confluency. The cells that reached 80% confluency were recovered and subcultured. The subculture method for the cells is as follows: the cells were washed with DPBS(−) (no calcium, no magnesium, Thermo Fisher Scientific Inc.) and then treated with a CTK solution ((0.25% trypsin+1 mg/ml collagenase IV+1 mM CaCl2+20% KSR in DPBS (−))). The CTK solution was removed, and the cells were washed with DPBS(−) twice. A medium was added to the cells, which were then recovered with a scraper and crushed into cell masses on the order of 50 to 200 μm by pipetting. Then, the cells were inoculated at an appropriate ratio onto SNL feeder cells.

1-2) Dispersed Culture of Human iPS Cell

After CTK solution treatment in the subculture method, the cells were washed with DPBS(−) once, prepared into single cells with 0.5× TrypLE™ Select (manufactured by Thermo Fisher Scientific Inc.), and recovered into a 15 ml centrifugal tube containing 9 ml of an iPS cell medium containing a ROCK inhibitor Y-27632 (manufactured by Mitsubishi Pharma Corp.). After centrifugation (room temperature, 180×g, 5 min), the supernatant was removed, and the cells were newly suspended in an iPS cell medium containing the ROCK inhibitor Y-27632, followed by the counting of viable cells. The cell concentration was adjusted to the one of interest using a human iPS cell medium containing the ROCK inhibitor Y-27632, and the cells were inoculated to a culture vessel for use in the test.

2) Main Test
2-1) Treatment with Test Substance (with Feeder Cell)

The cells were inoculated at 5×10$^3$ cells/0.1 ml/well to a 96-well plate (to which SNL feeder was inoculated on the previous day) using a human iPS cell medium containing the ROCK inhibitor Y-27632, and cultured for 1 day in a CO$_2$ incubator (5% CO$_2$, 37° C., wet). On the next day, the medium was replaced with a human iPS cell medium supplemented with the test substance (3 concentrations: 0.4, 1.0 and 2.0% (w/v)) or a non-supplemented human iPS cell medium. Then, the cells were recultured until 80% confluency, and used in expression analysis.

2-2) Treatment with Test Substance (without Feeder Cell)

The cells were inoculated at $5\times10^3$ cells/0.1 ml/well to a 96-well plate coated with iMatrix-511 silk (manufactured by Matrixome Inc.) using a human iPS cell medium containing the ROCK inhibitor Y-27632, and cultured for 1 day in a $CO_2$ incubator (5% $CO_2$, 37° C., wet). On the next day, the medium was replaced with a SNL-conditioned medium (medium in which feeder cells were cultured and then removed; containing nutrients derived from the feeder cells) supplemented with the test substance (2 concentrations: 1.0 and 2.0% (w/v)) or a SNL-conditioned medium. Then, the cells were recultured until 80% confluency, and used in expression analysis.

3) Gene Expression Analysis

Subsequently, the expression levels of undifferentiation-specific genes Nanog and Oct3/4 were measured. Nanog and Oct3/4 are transcriptional factors involved in the promotion of the ability to self-renew and the maintenance of an undifferentiation state and are expressed at a high level in human ES/iPS cells and as such, are widely used as undifferentiation markers of human ES/iPS cells. The expression levels of the undifferentiation markers were quantified by the following method.

3-1) FastLane Lysate (RNA) Extraction

FastLane lysate (RNA) was extracted using FastLane Cell cDNA kit (manufactured by Qiagen N.V.).

3-2) cDNA Synthesis cDNA was synthesized from the FastLane lysate (RNA) through RT-PCR reaction using QuantiTect Reverse Transcription Kit (manufactured by Qiagen N.V.).

3-3) Quantitative PCR

The quantitative PCR of OCT3/4 and NANOG was carried out under conditions of 95° C. for 30 seconds; (95° C. for 5 seconds; 60° C. for 30 seconds)×40; dissociation using SYBR Premix Ex Taq II (Tli RNaseH Plus) (manufactured by Takara Bio Inc.). The expression levels of the genes were indicated by values corrected for the expression level of GAPDH, and calculated with the expression level of a negative control group (no addition) defined as 1. The experiment was repeated N=3 times, and results having a p value of less than 0.05 in the Student's T-test (two-tailed test, no correspondence) as compared with a positive control group were determined to be significant.

(3) Analysis Results

Figure 2:
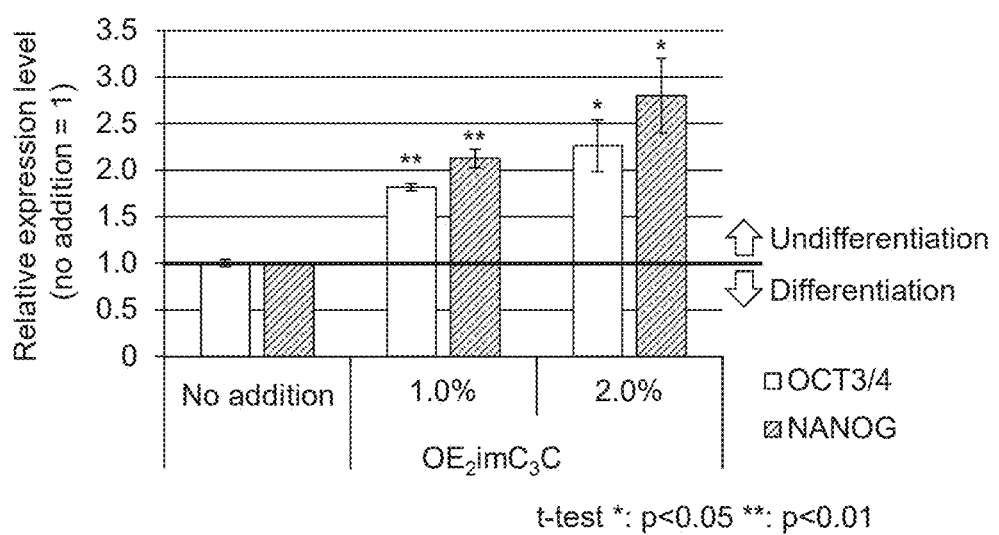
FIG. 2 is a graph showing results of undifferentiation-specific gene expression analysis (without feeder cells).

The results of measuring the relative expression levels of Nanog and Oct3/4 to the case of not adding $OE_2imC_3C$ are shown in each of FIG. 1 (with feeder cells) and FIG. 2 (without feeder cells) (N=3).

As shown in FIGS. 1 and 2, the addition of the zwitterion $OE_2imC_3C$ was found to amplify the undifferentiation markers and to promote the undifferentiation of the cells, both in the case of involving feeder cells and in the case of not involving feeder cells.

2. Cryoprotective Agent

Example 2

(1) Cell Freezing Experiment 1 (Slow Freezing Method)

(a) Synthesis of Aprotic Zwitterion $OE_2imC_3C$

The aprotic zwitterion $OE_2imC_3C$ was synthesized according to Synthesis Example 1.

(b) Preparation of Cryopreservation Solution

Four types of cryopreservation solutions having the following composition were provided.

CultureSure® cryopreservation solution (manufactured by FUJIFILM Wako Pure Chemical Corp.) (hereinafter, referred to as "FM")

$H_2O$

5% by weight of $DMSO/H_2O$

5% by weight of $OE_2imC_3C/H_2O$ (c) Cryopreservation of Cell

The cells to be frozen (two types) were centrifugally recovered by trypsin treatment and diluted with Dulbecco's modified Eagle medium (DMEM), and each cell concentration was measured. The types and cell concentrations of the cells are as follows.

Human skin fibroblasts $5.0\times10^5$ cells/100 μl

Mouse fibroblasts $C_{57}BL/6$-GFP $5.0\times10^5$ cells/100 μl

Subsequently, the cells of each type were dispensed at 1 ml/tube to 1.5 ml tubes, centrifuged, suspended in 100 μl each of the cryopreservation solutions described above, and frozen at a cooling temperature of −80° C. at a cooling rate of −1° C./min using a cell freezing container Mr. Frosty®.

Figure 3:
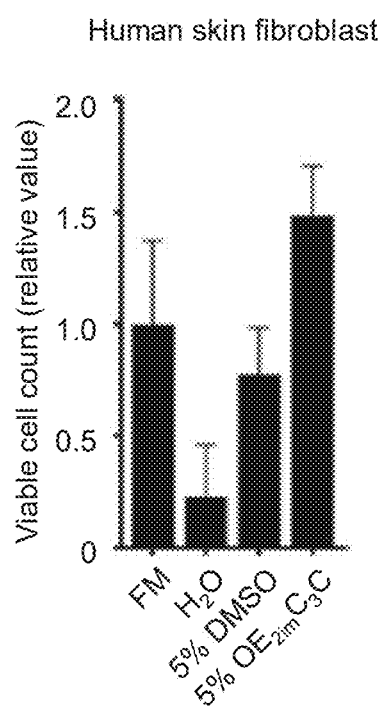
FIG. 3 is a graph showing a viable cell count (human skin fibroblasts) according to a slow freezing method.
Figure 4:
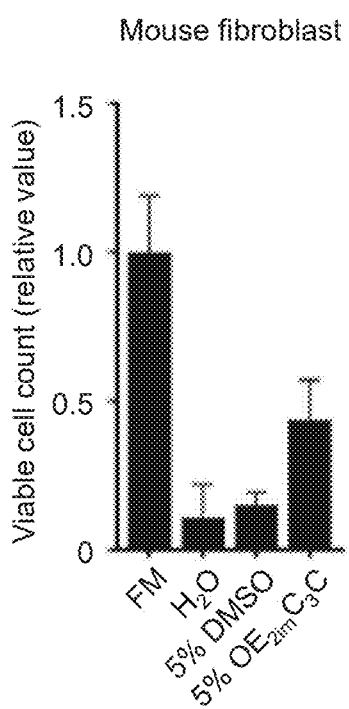
FIG. 4 is a graph showing a viable cell count (mouse fibroblasts) according to a slow freezing method.

(d) Thawing of Cell and Measurement of Viable Cell Count 1 ml of a medium was added to the cryopreservation vial for thawing, and a supernatant was removed by centrifugation. Subsequently, the cells obtained by centrifugation were resuspended in a medium, followed by the measurement of a viable cell count. The results are shown in FIGS. 3 and 4. Then, culture was started in a 6-well plate.

(e) Confirmation of Cell State 24 Hours Later 24 hours after the start of culture, the sample was fixed in 4% paraformaldehyde (PFA) and observed under a microscope. The results are shown in FIG. 5.

(f) Experimental Results

As shown in FIGS. 3 and 4, in the case of using a cryopreserving agent containing the aprotic zwitterion $OE_2imC_3C$, the cells after thawing had a larger viable cell count than that in the case of using conventional DMSO. Thus, the aprotic zwitterion $OE_2imC_3C$ was found to be effective as a cryoprotective agent. Particularly, in the case of freezing and thawing human skin fibroblasts (FIG. 3), the aprotic zwitterion $OE_2imC_3C$ was superior to the commercially available cryopreservation solution (FM).

Figure 5:
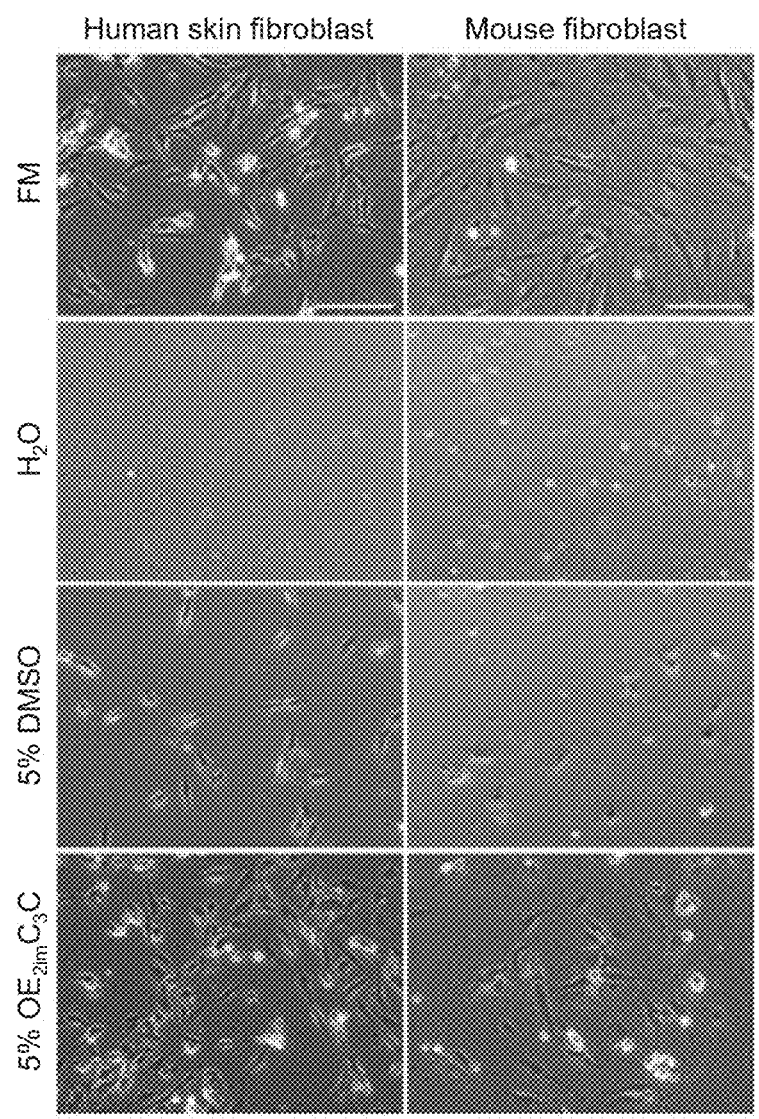
FIG. 5 is a microscope image showing a cell state 24 hours after the start of culture according to a slow freezing method.

As shown in FIG. 5, the cells cryopreserved using the aprotic zwitterion $OE_2imC_3C$ were confirmed to adhere to the dish bottom, as is the case with the commercially available product (FM), and found to maintain cell functions.

Example 3

(2) Cell Freezing Experiment 2 (Slow Freezing Method)

(a) Synthesis of Five Types of Aprotic Zwitterions

The aprotic zwitterions used in the experiment were synthesized based on Synthesis Examples described above.

(b) Preparation of Cryopreservation Solution

Six types of cryopreservation solutions having the following composition were provided.

5% by weight of $OE_2imC_5C/H_2O$
5% by weight of $C_1imC_3C/H_2O$
5% by weight of $OE_2imC_3C/H_2O$
5% by weight of $C_1imC_3S/H_2O$
5% by weight of $N_{2,2,OE2,C3C}/H_2O$
CultureSure® cryopreservation solution (manufactured by FUJIFILM Wako Pure Chemical Corp.) (hereinafter, referred to as "FM")

(c) Cryopreservation of Cell

The cells to be frozen were centrifugally recovered by trypsin treatment and diluted with Dulbecco's modified Eagle medium (DMEM), and the cell concentration was measured. The types and cell concentrations of the cells are as follows.
Human skin fibroblasts $5.0 \times 10^5$ cells/100 μl Subsequently, the cells were dispensed at 1 ml/tube to 1.5 ml tubes, centrifuged, suspended in 100 μl each of the cryopreservation solutions described above, and frozen at a cooling temperature of −80° C. at a cooling rate of −1° C./min using a cell freezing container Mr. Frosty®.

(d) Thawing of Cell and Measurement of Viable Cell Count 1 ml of a medium was added to the cryopreservation vial for thawing, and a supernatant was removed by centrifugation. Subsequently, the cells obtained by centrifugation were resuspended in a medium, followed by the measurement of a viable cell count. The results are shown in FIG. 6.

(e) Experimental Results

Figure 6:
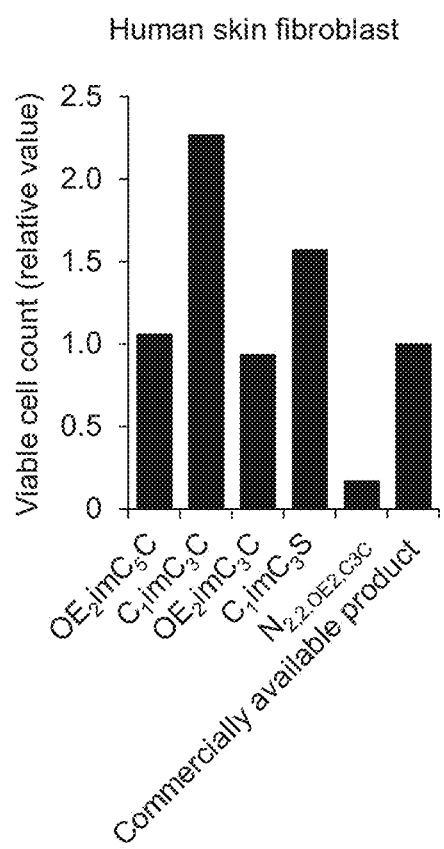
FIG. 6 is a graph showing a viable cell count (human skin fibroblasts) according to a slow freezing method.

As shown in FIG. 6, all the aprotic zwitterions of the present invention were able to maintain a sufficiently high cell survival rate and were found to be effective as a cryoprotective agent. Particularly, the aprotic zwitterion in which the cation site was an imidazolium cation was shown to achieve performance equivalent to or greater than that of the commercially available cryopreservation solution (FM).
(3) Cell Freezing Experiment 3 (Rapid Freezing Method)

Example 4

(a) Synthesis of Aprotic Zwitterion $OE_2imC_3C$

The aprotic zwitterion $OE_2imC_3C$ was synthesized by the same procedures as in the section 1(1).

(b) Preparation of Cryopreservation Solution

Four types of cryopreservation solutions having the following composition were provided.
Human ES cell and human iPS cell cryopreservation solution DAP213 (manufactured by ReproCELL Inc.)
75% by weight of $OE_2imC_3C/H_2O$
50% by weight of $OE_2imC_3C/H_2O$
25% by weight of $OE_2imC_3C/H_2O$ (c) Cryopreservation of Cell The cells to be frozen (two types) were centrifugally recovered by trypsin treatment and diluted with Dulbecco's modified Eagle medium (DMEM), and each cell concentration was measured. The types and cell concentrations of the cells are as follows.
Human skin fibroblasts $8.2 \times 10^5$ cells/100 μl (N=3)
Mouse fibroblasts $C_{57}BL/6$-GFP $1.2 \times 10^6$ cells/100 μl (N=3)

Subsequently, the cells of each type were dispensed at 1 ml/tube to 1.5 ml tubes, centrifuged, suspended in 100 μl each of the cryopreservation solutions described above, and immediately thereafter rapidly frozen in liquid nitrogen within 10 to 15 seconds. Then, the cells were preserved for 3 days in a liquid nitrogen tank.

(d) Thawing of Cell and Measurement of Viable Cell Count

Figure 7:
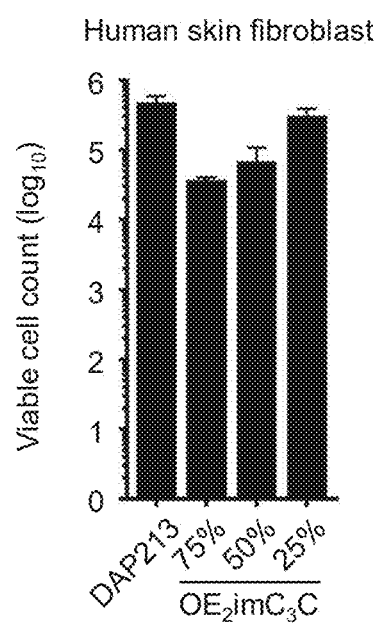
FIG. 7 is a graph showing a viable cell count (human skin fibroblasts) after thawing according to a rapid freezing method.
Figure 8:
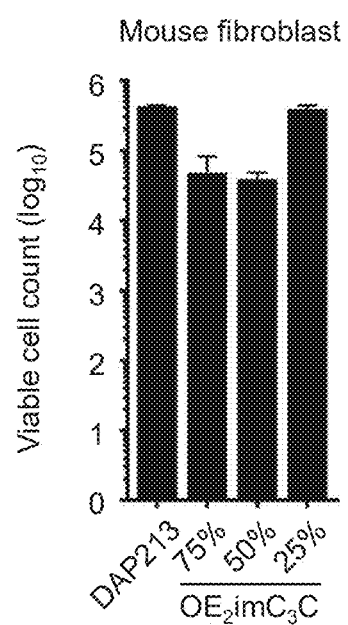
FIG. 8 is a graph showing a viable cell count (mouse fibroblasts) after thawing according to a rapid freezing method.

The cryopreservation vial was rapidly thawed with 1 ml of a medium, and a supernatant was removed by centrifugation. Subsequently, the cells obtained by centrifugation were resuspended in a medium, followed by the measurement of a viable cell count. The results are shown in FIGS. 7 and 8. Then, culture was started in a 6-well plate.

Figure 9:
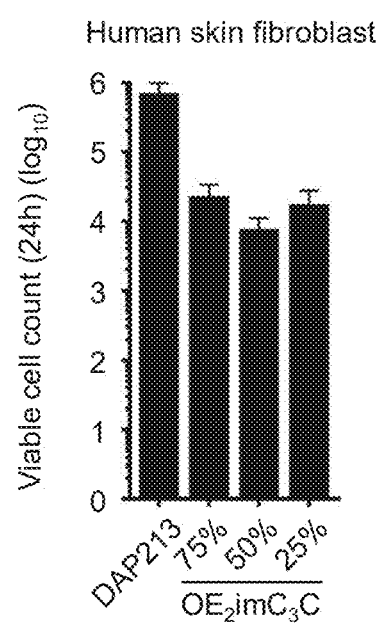
FIG. 9 is a graph showing a viable cell count (human skin fibroblasts) 24 hours after the start of culture according to a rapid freezing method.
Figure 10:
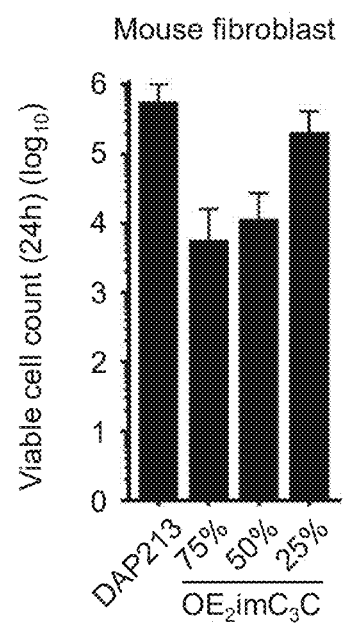
FIG. 10 is a graph showing a viable cell count (mouse fibroblasts) 24 hours after the start of culture according to a rapid freezing method.

(e) Measurement of Viable Cell Count 24 Hours Later 24 hours after the start of culture, the viable cell count was measured. The results are shown in FIGS. 9 and 10.
(F) Experimental Results As shown in FIGS. 7 and 8, in the case of performing rapid freezing using a cryopreserving agent containing the aprotic zwitterion $OE_2imC_3C$, the viable cell count after thawing was a value comparable to that of the commercially available cryopreservation solution DAP213. As for the concentration of the aprotic zwitterion $OE_2imC_3C$ in the cryopreservation solution, a lower concentration (25% by weight) offered a higher survival rate of the cells.

As shown in FIGS. 9 and 10, the viable cell count of the cells rapidly frozen using a cryopreserving agent containing the aprotic zwitterion $OE_2imC_3C$ and cultured for 24 hours also reached a high value, albeit being inferior to the commercially available cryopreservation solution DAP213.
(4) Cell Freezing Experiment 4 (Slow Freezing Method)

(Example 5) to (Example 28)

(a) Synthesis of Aprotic Zwitterion

The aprotic zwitterions used in the experiment were synthesized based on Synthesis Examples described above.

(b) Preparation of Cryopreservation Solution

As for the cryopreservation solution, the aprotic zwitterion of each example was dissolved by the addition of purified water to prepare test solutions containing 5% by weight and 10% by weight of the aprotic zwitterion.

(c) Cryopreservation of Cell

The cells to be frozen were centrifugally recovered by trypsin treatment and diluted with Dulbecco's modified Eagle medium (DMEM), and each cell concentration was measured. The types and cell concentrations of the cells are as follows.
Mouse skin fibroblasts $5.0 \times 10^5$ cells/100 μl
Human renal fat cells $5.0 \times 10^5$ cells/100 μl Subsequently, the cells of each type were dispensed at 1 ml/tube to 1.5 ml tubes, centrifuged, suspended in 100 μl each of the cryopreservation solutions described above, and frozen at a cooling temperature of −80° C. at a cooling rate of −1° C./min using a cell freezing container Mr. Frosty®.

(d) Thawing of Cell and Measurement of Viable Cell Count 1 ml of a medium was added to the cryopreservation vial for thawing, and a supernatant was removed by centrifugation. Subsequently, the cells obtained by centrifugation were resuspended in a medium, followed by the measurement of a viable cell count. The results are indicated by a ratio to the viable cell count of $OE_2imC_3C$.

(e) Glass Transition Temperature and Heat Quantity

The glass transition temperature and the heat quantity were determined by differential scanning calorimetry (DSC). The measurement was performed with a cooling rate set to −1° C./min and a heating rate set to 5° C./min.

TABLE 1

| Example | Zwitterion | Tg (° C.) 10 wt % | Heat quantity (J/g) 10 wt % | Mouse skin fibroblast | | Human renal cell | |
| --- | --- | --- | --- | --- | --- | --- | --- |
| | | | | 5 wt % | 10 wt % | 5 wt % | 10 wt % |
| 5 | $OE_1imC_3C$ | −86.07 | −188.49 | 0.71 | 0.53 | 0.29 | 0.33 |
| 6 | $OE_2imC_3C$ | −85.69 | −198.7 | 1.00 | 1.00 | 1.00 | 1.00 |
| 7 | $OE_2imC_3S$ | −85.48 | −190.84 | 0.16 | 0.23 | 0.28 | 0.22 |
| 8 | $OE_2imC_5C$ | −83.34 | −190.82 | 0.82 | 0.95 | 0.44 | 0.32 |

TABLE 2

| Example | Zwitterion | Tg (° C.) 10 wt % | Heat quantity (J/g) 10 wt % | Mouse skin fibroblast | | Human renal cell | |
| --- | --- | --- | --- | --- | --- | --- | --- |
| | | | | 5 wt % | 10 wt % | 5 wt % | 10 wt % |
| 9  | $C_1imC_2C$ | −96.61 | −195.56 | 0.61 | 1.00 | 1.41 | 1.24 |
| 10 | $C_1imC_5C$ | −84.51 | −169.61 | 0.82 | 1.09 | 1.94 | 0.72 |
| 11 | $C_1imC_3C$ | −95.22 | −199.61 | 1.16 | 1.08 | 1.29 | 0.20 |
| 12 | $C_1imC_3S$ | −88.88 | −173.36 | 0.74 | 0.72 | 0.71 | 0.26 |
| 13 | $C_4imC_3C$ | −75.3  | −198.66 | 0.31 | 0.56 | 0.45 | 0.20 |
| 14 | $C_4imC_5C$ | −74.59 | −183.73 | 0.24 | 0.30 | 0.57 | 0.17 |
| 15 | $C_8imC_3S$ | — | — | 0.00 | 0.04 | 0.00 | 0.33 |
| 16 | $C_8imC_4S$ | — | — | 0.00 | 0.04 | 0.00 | 0.33 |
| 17 | $C_8imC_3C$ | −84.05 | −187.42 | 0.04 | 0.05 | 0.03 | 0.06 |

| Example | Zwitterion | Tg (° C.) 10 wt % | Heat quantity (J/g) 10 wt % | Mouse skin fibroblast | | Human renal cell | |
| --- | --- | --- | --- | --- | --- | --- | --- |
| | | | | 5 wt % | 10 wt % | 5 wt % | 10 wt % |
| 18 | $C_4imC_3C$ | −75.3  | −198.66 | 0.31 | 0.56 | 0.45 | 0.20 |
| 19 | $C_4imC_5C$ | −74.59 | −183.73 | 0.24 | 0.30 | 0.57 | 0.17 |
| 20 | $VimC_3C$   | −85.74 | −182.17 | 0.48 | 0.83 | 1.29 | 0.92 |
| 21 | $VimC_3S$   | −81.06 | −170.72 | 0.66 | 1.02 | 2.94 | 1.08 |
| 22 | $VimC_4S$   | — | — | 0.63 | 1.03 | 2.71 | 1.40 |
| 23 | $AimC_3C$   | −85   | −188.37 | 0.31 | 0.36 | 1.12 | 0.80 |
| 24 | $AimC_3S$   | −85.76 | −213.16 | 0.45 | 0.69 | 2.76 | 1.08 |
| 25 | $AimC_4S$   | −86.07 | −210.34 | 0.55 | 0.53 | 2.06 | 1.28 |

| Example | Zwitterion | Tg (° C.) 10 wt % | Heat quantity (J/g) 10 wt % | Mouse skin fibroblast 5 wt % | Mouse skin fibroblast 10 wt % | Human renal cell 5 wt % | Human renal cell 10 wt % |
|---|---|---|---|---|---|---|---|
| 26 | $PyC_3C$ | −90.35 | −182.59 | 0.77 | 0.98 | 1.76 | 1.32 |
| 27 | $PyrrC_3C$ | −91.85 | −188.06 | 0.63 | 0.58 | 0.46 | 0.35 |
| 28 | $N_{1,1,14}C_3C$ | −74.96 | −182.67 | 0.58 | 0.77 | 0.59 | 0.56 |

All the zwitterions had an observed glass transition temperature of −70° C. or lower. The mouse-derived cells and the human-derived cells exhibited a tendency differing among the zwitterions.

(5) Influence on Cell Cycle

Example 29

The cells used were human fibroblasts.

The test groups were 1% addition groups and 2% addition groups of DMSO and HLS ($OE_2imC_3C$) vs. a control.

Figure 11:
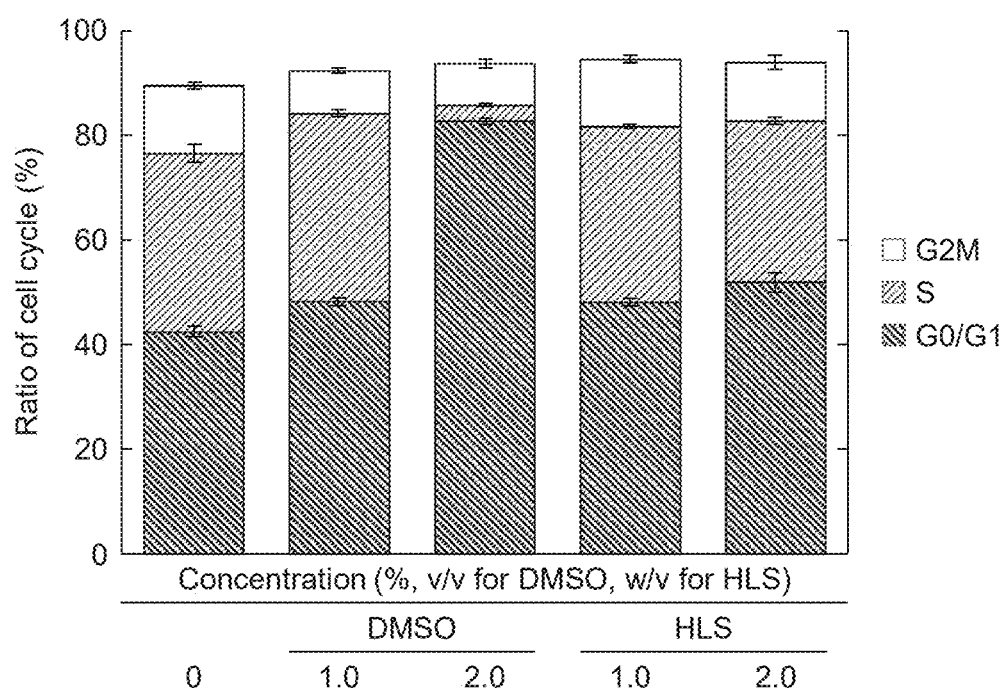
FIG. 11 is a graph showing the influence of the medium additive of the present invention on a cell cycle.

Cell cycle analysis was conducted using Click-iT® Plus EdU cell proliferation assay (Thermo Fisher Scientific Inc.) containing 5-ethynyl-2'-deoxyuridine (EdU) according to the manufacturer's protocol. The cells were incubated in 10 µM EdU for 1 hour, treated with trypsin, then fixed in 4% PFA, and labeled with Alexa Fluor 647 picolyl azide. The cells were stained with 4',6-diamidino-2-phenylindole (DAPI) and analyzed with BD FACSAria™ III (BD Biosciences). The results are shown in FIG. 11. The addition of 2% DMSO prolonged the G0/G1 phase and drastically shortened the S phase, whereas 2% HLS ($OE_2imC_3C$) had little influence as compared with no addition.

(6) Influence on Development of Zebrafish

Example 30

Figure 12:
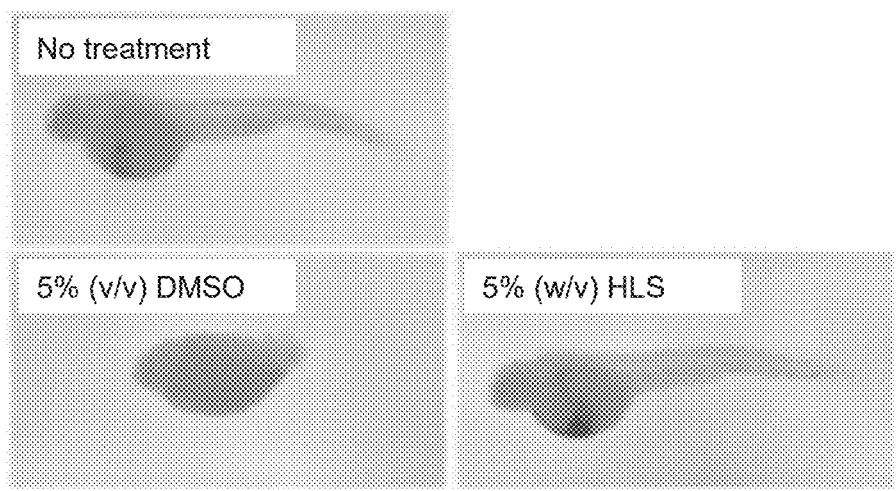
FIG. 12 is an image showing the influence of the medium additive of the present invention on the development of zebrafish.

All experiments were conducted based on a protocol approved by the animal experiment committee of Kanazawa University. Wild-type zebrafish AB* was raised at 28.5° C. with 14-hour light/10-hour dark cycles in a circulating water system. The medium used was E3 medium (5 mM NaCl, 0.17 mM KCl, 0.33 mM CaCl2, 0.33 mM MgSO4). The medium was supplemented with 1%, 2%, 5% or 10% DMSO or HLS ($OE_2imC_3C$). For each test group, eggs were fertilized and then cultured for 1.5 to 24 hours. The embryos thus cultured were washed with E3 medium twice and treated with 1-phenyl-2-thiourea (FUJIFILM Wako Pure Chemical Corp.) in order to prevent pigmentation. The embryos were stained with 0.6 mg/mL o-dianisidine (Tokyo Chemical Industry Co., Ltd.) for 15 minutes and fixed in 4% paraformaldehyde (FUJIFILM Wako Pure Chemical Corp.). The embryos were washed with phosphate-buffered saline containing 0.1% Tween (Sigma-Aldrich Co. LLC) twice. The results are shown in Table 5 and FIG. 12. The survival rate was similar between DMSO and HLS ($OE_2imC_3C$) up to the 2% addition groups, whereas the survival rate differed largely therebetween in the 5% addition groups. The fertilized eggs that survived in 5% DMSO did not normally develop.

TABLE 5

| | Survival rate Concentration (%, v/v for DMSO, w/v for HLS) | | | | |
|---|---|---|---|---|---|
| | 0 | 1 | 2 | 5 | 10 |
| DMSO | 27/27 | 27/27 | 27/27 | 4/27* | 0/27 |
| HLS | | 27/27 | 27/27 | 27/27 | 0/27 |

*Abnormality was observed in all individuals.

(7) Use as Additive for Medium

Examples 31 to 61

(a) Synthesis of Five Types of Aprotic Zwitterions

The aprotic zwitterions used in the experiment were synthesized based on Synthesis Examples described above.

Creatin and betaine were used as natural aprotic zwitterions.

(b) Preparation of Cryopreservation Solution

As for the cryopreservation solution, 5 g or 10 g each of the aprotic zwitterions to be tested was dissolved in a medium base purified water into 100 g to prepare cryopreservation solutions.

5 parts by weight and 10 parts by weight of an additive were added per 100 parts by weight of each preservation solution prepared to prepare samples.

(c) Cryopreservation of Cell

The cells to be frozen were centrifugally recovered by trypsin treatment and diluted with Dulbecco's modified Eagle medium (DMEM), and each cell concentration was measured. The types and cell concentrations of the cells are as follows.

Mouse skin fibroblasts $5.0 \times 10^5$ cells/100 µl
Human renal fat cells $5.0 \times 10^5$ cells/100 µl
K562 $5.0 \times 10^5$ cells/100 µl Subsequently, the cells of each type were dispensed at 1 ml/tube to 1.5 ml tubes, centrifuged, suspended in 100 µl each of the cryopreservation solutions described above, and frozen at a cooling temperature of −80° C. at a cooling rate of −1° C./min using a cell freezing container Mr. Frosty®.

(d) Thawing of Cell and Measurement of Viable Cell Count 1 ml of a medium was added to the cryopreservation vial for thawing, and a supernatant was removed by centrifugation. Subsequently, the cells obtained by centrifugation were resuspended in a medium, followed by the measurement of a viable cell count.

The results are indicated by a ratio to the viable cell count of CultureSure (FUJIFILM Wako Pure Chemical Corp.).

TABLE 6

| Example | Medium for freezing (weight ratio) Nonionic liquid | Medium base | Additive | Ratio (weight ratio) | | | Survival rate (relative ratio) Mouse fibroblast | BOSC | K562 |
|---|---|---|---|---|---|---|---|---|---|
| 31 | $OE_2imC_3C$ | Water | DMSO | 10 | 90 | 0 | 0.32 | 0.07 | 0.13 |
| 32 | $OE_2imC_3C$ | Water | DMSO | 10 | 90 | 10 | 0.63 | 0.77 | 1.51 |
| 33 | $OE_2imC_3C$ | Water | DMSO | 10 | 90 | 15 | 0.84 | 1.00 | 1.74 |
| 34 | $VimC_3S$ | Water | DMSO | 10 | 90 | 0 | 0.28 | 0.09 | 0.14 |
| 35 | $VimC_3S$ | Water | DMSO | 10 | 90 | 10 | 0.36 | 0.22 | 1.20 |
| 36 | $VimC_3S$ | Water | DMSO | 10 | 90 | 15 | 0.35 | 0.35 | 0.33 |
| 37 | $ClimC_3S$ | Water | DMSO | 10 | 90 | 0 | 0.12 | 0.05 | 0.08 |
| 38 | $ClimC_3S$ | Water | DMSO | 10 | 90 | 10 | 0.84 | 0.66 | 1.46 |
| 39 | $ClimC_3S$ | Water | DMSO | 10 | 90 | 15 | 0.92 | 1.01 | 1.80 |
| 40 | Trimethylglycine | Water | DMSO | 10 | 90 | 0 | 0.53 | 0.03 | 0.21 |
| 41 | Trimethylglycine | Water | DMSO | 10 | 90 | 10 | 0.75 | 0.29 | 0.33 |
| 42 | Trimethylglycine | Water | DMSO | 10 | 90 | 15 | 0.74 | 0.52 | 0.82 |
| 43 | Carnitine | Water | DMSO | 10 | 90 | 0 | 0.41 | 0.05 | 0.16 |
| 44 | Carnitine | Water | DMSO | 10 | 90 | 10 | 0.65 | 0.80 | 0.91 |
| 45 | Carnitine | Water | DMSO | 10 | 90 | 15 | 0.99 | 0.90 | 1.21 |
| Reference Example | Culture Sure | | | | | | 1.00 | 1.00 | 1.00 |

TABLE 7

| Example | Medium for freezing (weight ratio) Nonionic liquid | Medium base | Additive | Ratio (weight ratio) | | | Survival rate (relative ratio) Mouse fibroblast | BOSC |
|---|---|---|---|---|---|---|---|---|
| 46 | $C_1imC_3C$ | Water | | 5 | 95 | 0 | 0.59 | 0.18 |
| 47 | $C_1imC_3C$ | Water | Glycerin | 5 | 95 | 5 | 0.75 | 0.39 |
| 48 | $C_1imC_3C$ | Water | Glycerin | 5 | 95 | 10 | 1.05 | 0.43 |
| 49 | $C_1imC_3C$ | Water | Glycerin | 5 | 95 | 15 | 0.73 | 0.64 |
| 50 | $C_1imC_3C$ | Water | DMSO | 5 | 95 | 5 | 0.85 | 0.55 |
| 51 | $C_1imC_3C$ | Water | DMSO | 5 | 95 | 10 | 0.98 | 1.15 |
| 52 | $C_1imC_3C$ | Water | DMSO | 5 | 95 | 15 | 1.15 | 0.95 |
| 53 | $OE_2imC_3C$ | Water | | 10 | 90 | 0 | 0.53 | 0.31 |
| 54 | $OE_2imC_3C$ | Water | Glycerin | 10 | 90 | 5 | 0.50 | 0.42 |
| 55 | $OE_2imC_3C$ | Water | Glycerin | 10 | 90 | 10 | 0.75 | 0.61 |
| 56 | $OE_2imC_3C$ | Water | Glycerin | 10 | 90 | 15 | 0.77 | 0.64 |
| 57 | $OE_2imC_3C$ | Water | DMSO | 10 | 90 | 5 | 0.82 | 0.50 |
| 58 | $OE_2imC_3C$ | Water | DMSO | 10 | 90 | 10 | 0.91 | 1.00 |
| 59 | $OE_2imC_3C$ | Water | DMSO | 10 | 90 | 15 | 1.10 | 1.20 |
| 60 | $OE_2imC_3C$ | Water | Carnitine | 10 | 90 | 10 | | 0.19 |
| 61 | $OE_2imC_3C$ | Water | $AimC_3S$ | 10 | 90 | 10 | | 0.21 |
| Reference Example | CultureSure | | | | | | 1.00 | 1.00 |

The invention claimed is:

1. A medium for cryopreservation, comprising an aqueous solution of an aprotic zwitterion represented by formula (4):

$$R_4-X-R_2-A \quad (4)$$

wherein $R_4$ is an alkyl group having 1 to 7 carbon atoms, an alkenyl group having 1 to 7 carbon atoms, or an alkyl group having 1 to 7 carbon atoms and containing an ether bond, X is a cation moiety of the zwitterion and represents a cation selected from the group consisting of an imidazolium cation, a phosphonium cation, a sulfonium cation, a pyrazolium cation, a pyridinium cation, a pyrrolidinium cation, a morpholinium cation, a cyclopropenylium cation and a piperidinium cation, A represents an anion moiety and represents an anion selected from the group consisting of $SO_3^-$, $-COO^-$, $-OP=O(H)O^-$, $-OP=O(CH_3)O^-$ and $-OP=O(OR_3)O^-$, $R_2$ is an alkylene group having 1 to 5 carbon atoms and optionally having a substituent, and $R_3$ is hydrogen or an alkyl group optionally having a heteroatom in the molecular chain, and a cell-permeable substance, wherein the amount of the cell-permeable substance is from 1 to 30 parts by weight per 100 parts by weight of the aqueous solution of the aprotic zwitterion.

2. The medium for cryopreservation according to claim 1, wherein the aprotic zwitterion is represented by the following formula (1):

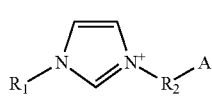

(1)

wherein A is an anion selected from the group consisting of $SO_3^-$, $-COO^-$, $-OP=O(H)O^-$, $-OP=O(CH_3)O^-$ and $-OP=O(OR_3)O^-$, $R_1$ is an alkyl group having 1 to 7 carbon atoms, an alkenyl group having 1 to 7 carbon atoms, or an alkyl group having 1 to 7 carbon atoms and containing an ether bond, $R_2$ is an alkylene group having 3 to 5 carbon atoms, and $R_3$ is hydrogen or an alkyl group optionally having a heteroatom in the molecular chain.

3. The medium for cryopreservation according to claim 2, wherein the aprotic zwitterion is represented by the following formula (2) or (3):

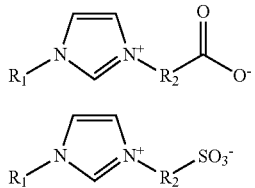

wherein $R_1$ and $R_2$ are as defined in claim 2.

4. The medium for cryopreservation according to claim 1, wherein the $R_4$ is an alkenyl group having 1 to 7 carbon atoms.

5. A medium for cryopreservation, comprising an aqueous solution of an aprotic zwitterion represented by the formula (4'):

$$R_{4'}\text{—}X'\text{—}R_{2'}\text{-}A' \tag{4'}$$

wherein $R_{4'}$ is an alkyl group having 1 to 7 carbon atoms, an alkenyl group having 1 to 7 carbon atoms, or an alkyl group having 1 to 7 carbon atoms and containing an ether bond, X' is a cation moiety of the zwitterion and represents a cation that has a cyclic structure having 1 to 6 carbon atoms, contains one or two or more nitrogen atoms, and has one or two or more substituents on the nitrogen atom(s), A' is —COO⁻ or SO₃⁻, the cation is present on nitrogen of the X' or non-localized in the whole X', and the anion is present on —COO⁻or —SO₃⁻, $R_{2'}$ is an alkylene group having 1 to 5 carbon atoms and optionally having a substituent, and a cell-permeable substance, wherein the amount of the cell-permeable substance is from 1 to 30 parts by weight per 100 parts by weight of the aqueous solution of the aprotic zwitterion.

* * * * *